April 1, 1941.    P. LANDROCK ET AL    2,236,712
FEEDING, SEVERING, AND CONTROLLING MECHANISM
FOR PHOTOGRAPHIC COPYING MACHINES
Filed April 29, 1939    13 Sheets-Sheet 1
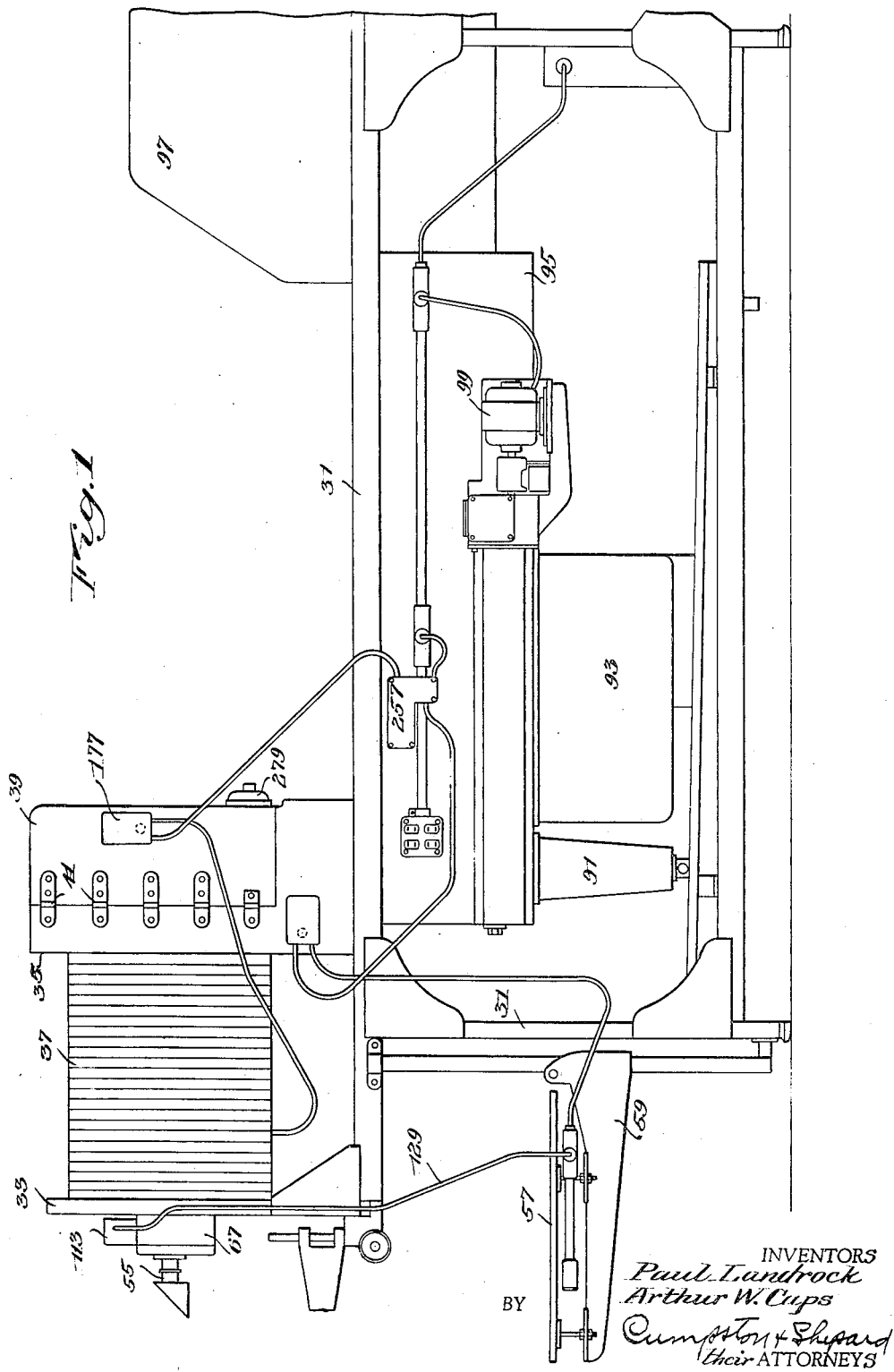
INVENTORS
Paul Landrock
Arthur W. Cups
BY Cumpston & Shepard
their ATTORNEYS

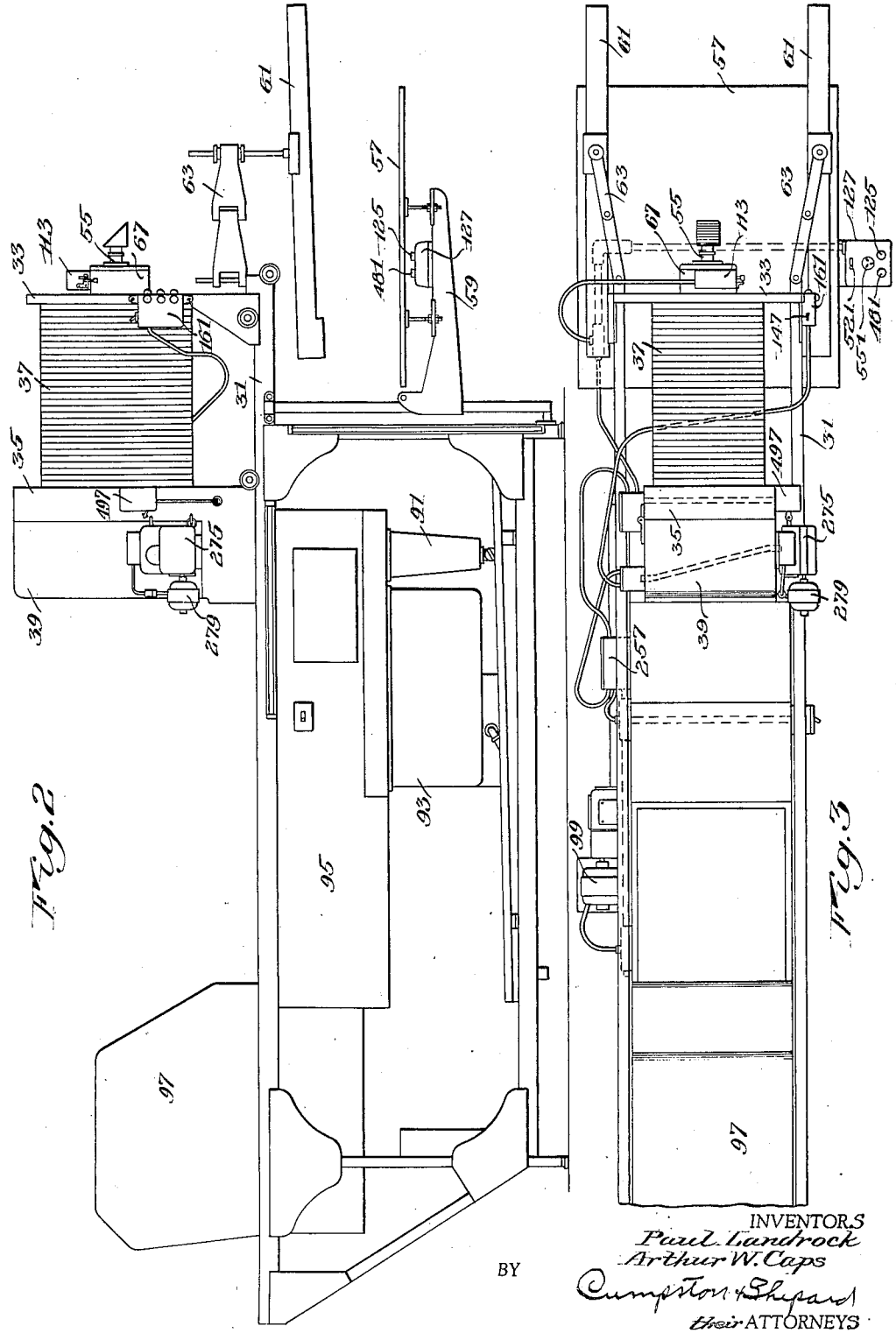

April 1, 1941.   P. LANDROCK ET AL   2,236,712
FEEDING, SEVERING, AND CONTROLLING MECHANISM
FOR PHOTOGRAPHIC COPYING MACHINES
Filed April 29, 1939   13 Sheets-Sheet 3

INVENTORS
Paul Landrock
Arthur W. Caps
BY
Cumpston & Shepard
their ATTORNEYS

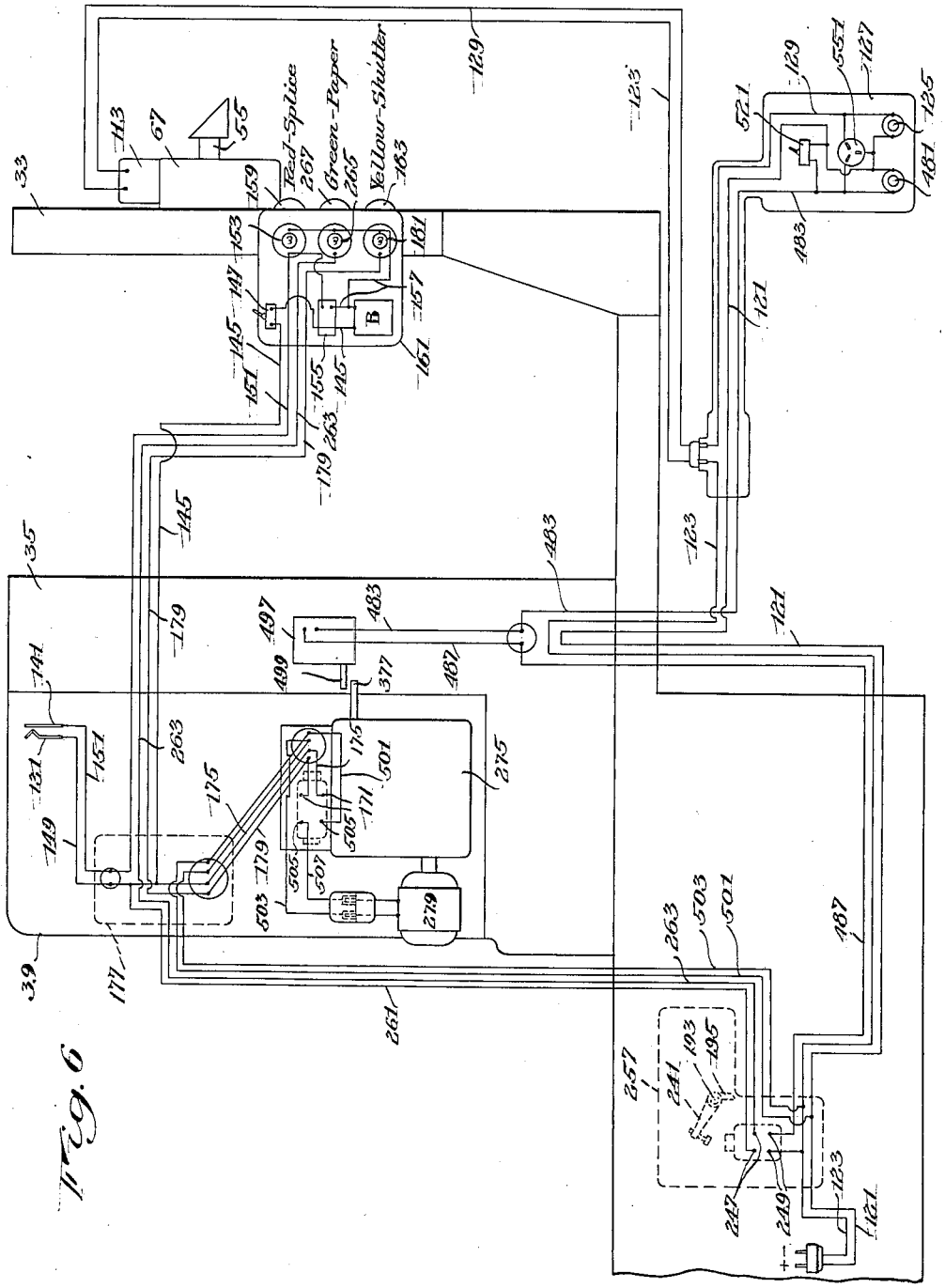

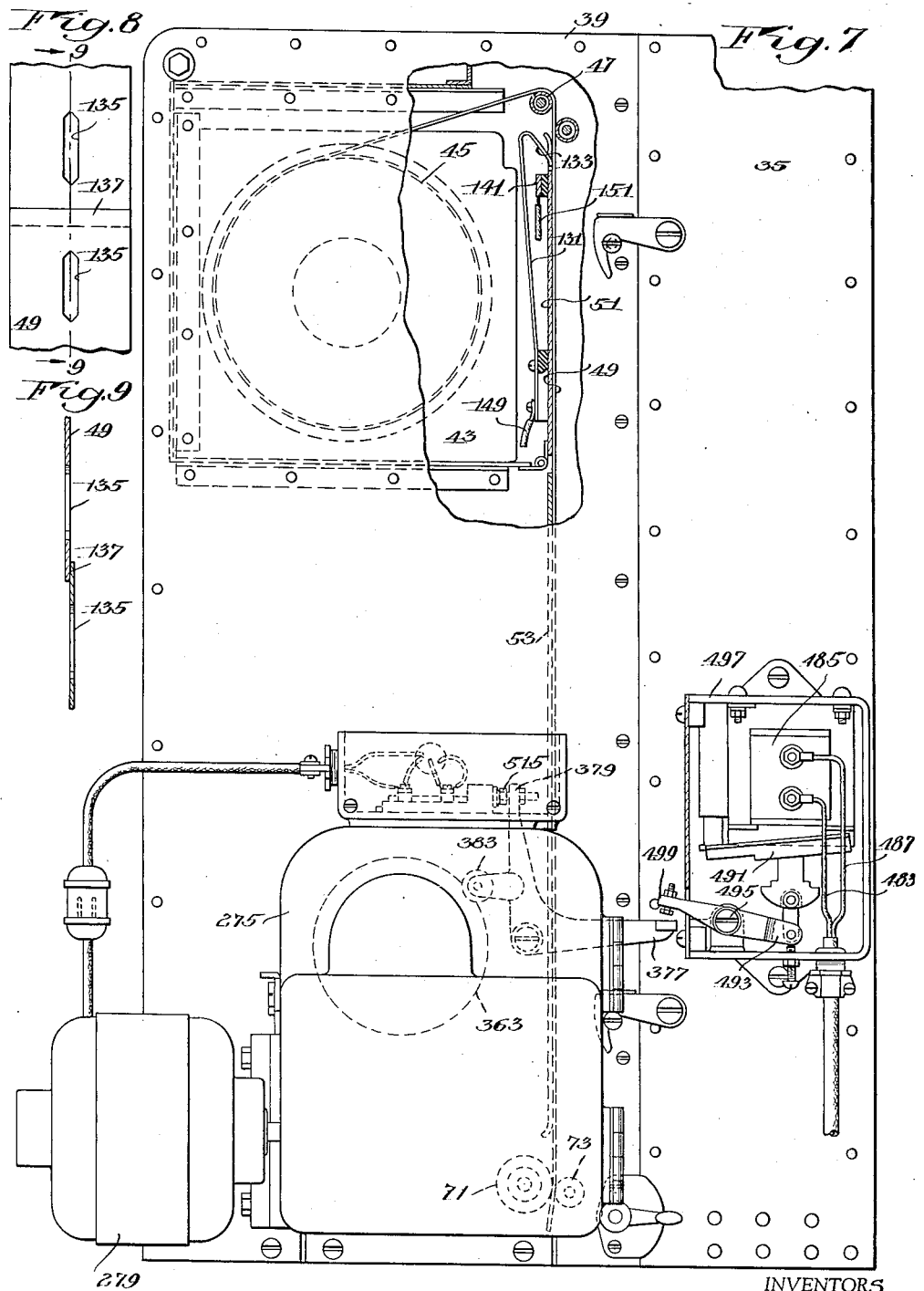

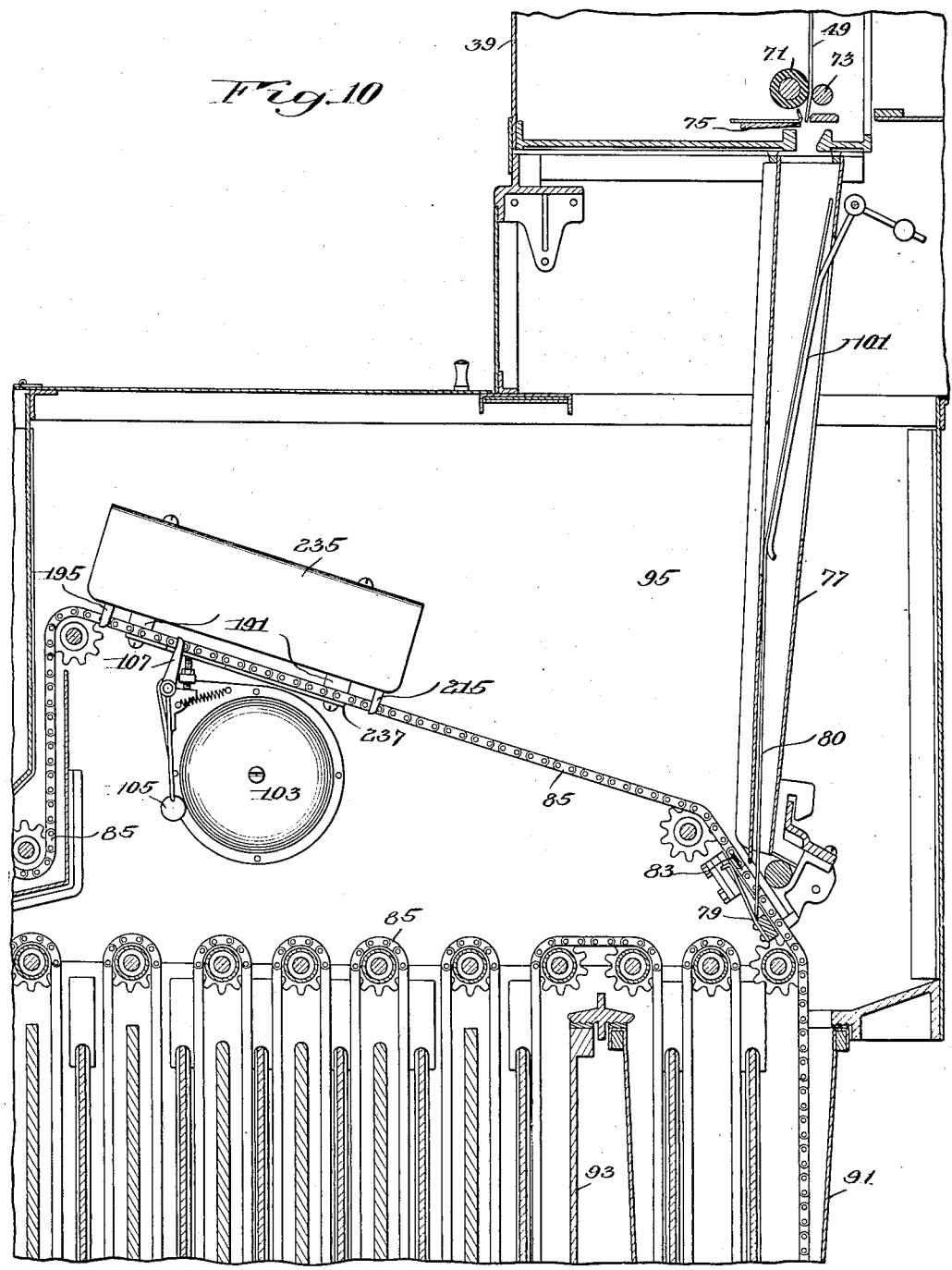

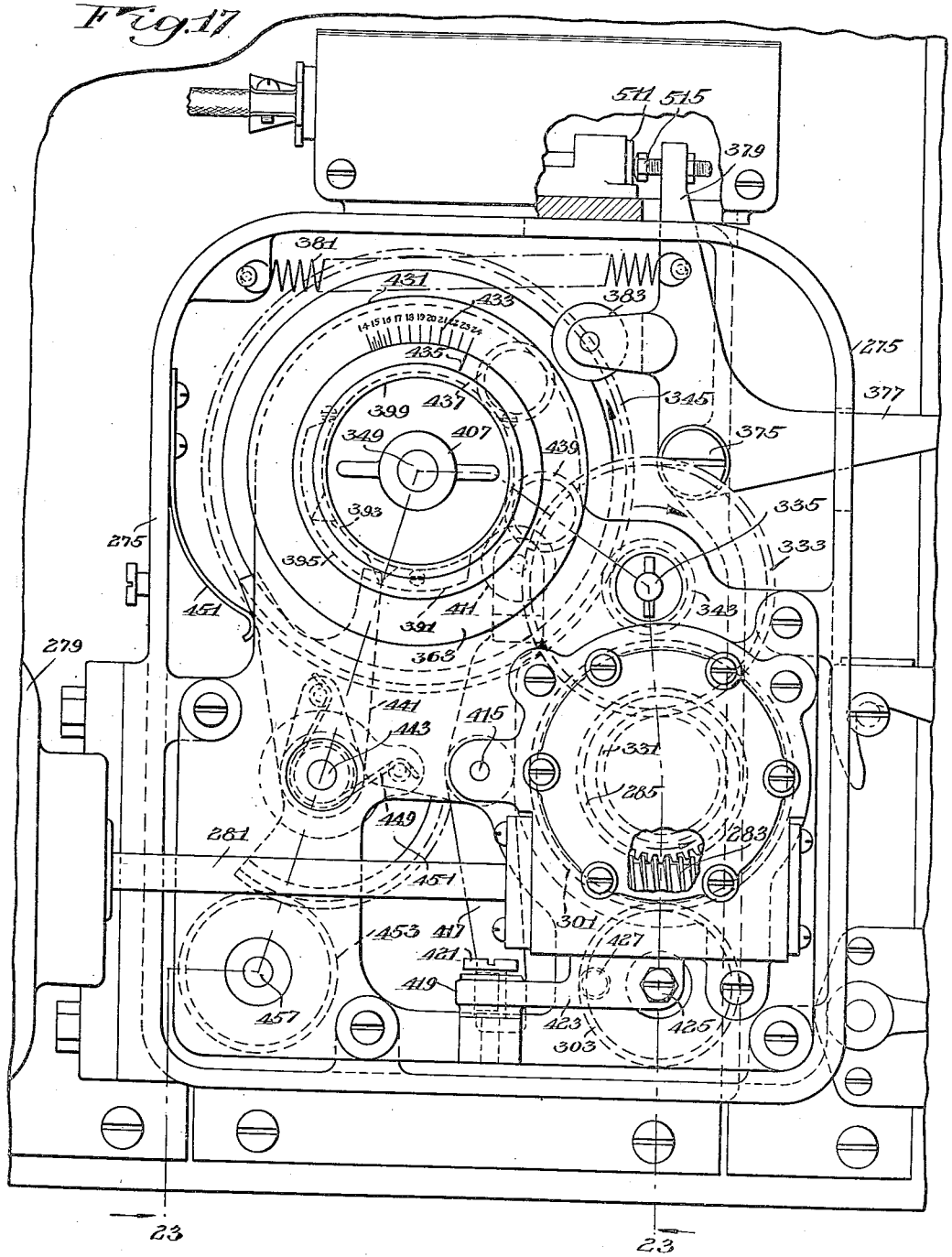

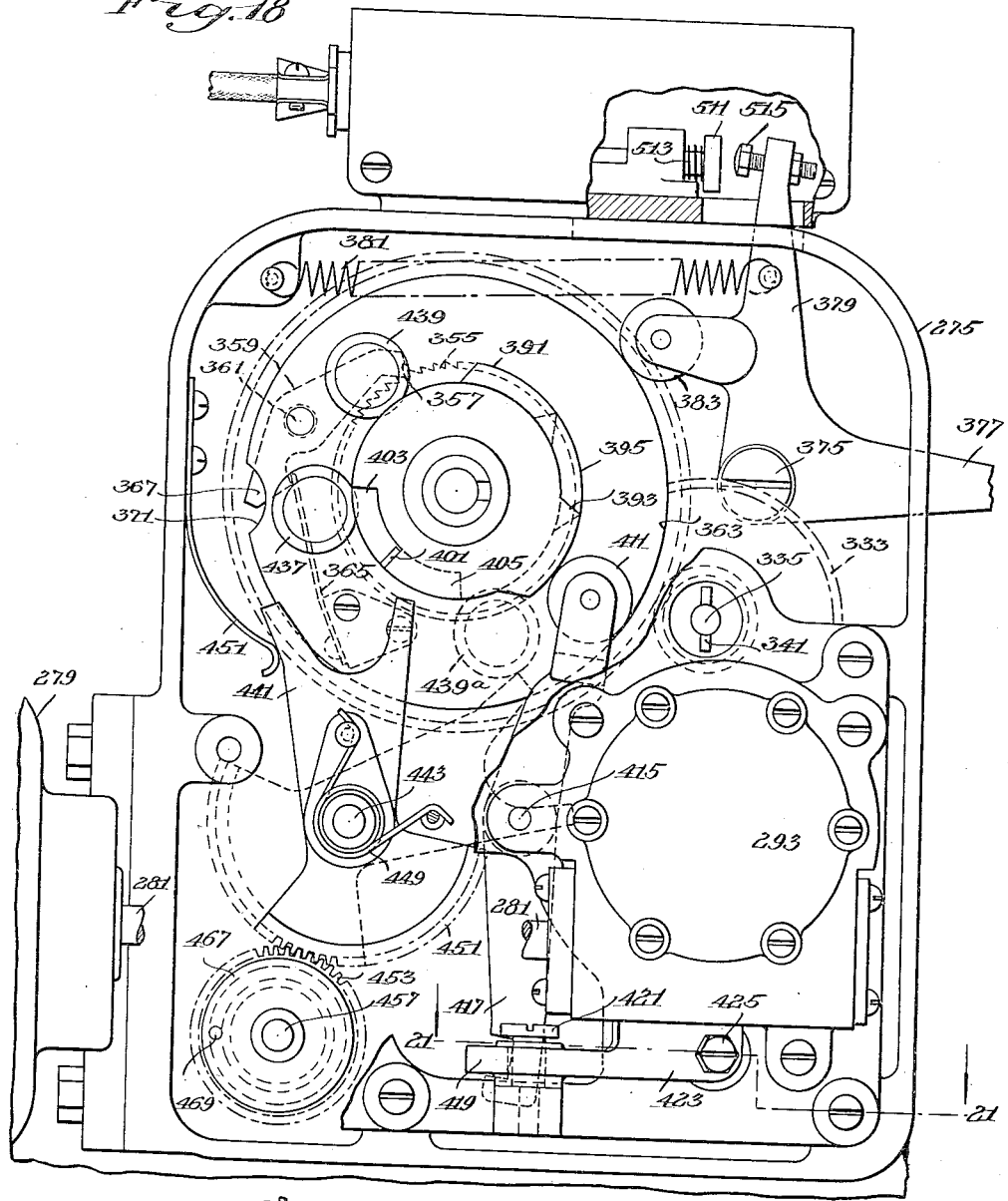
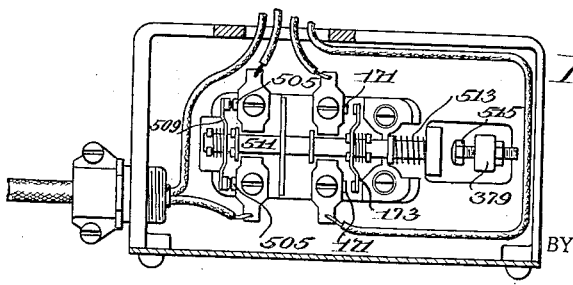

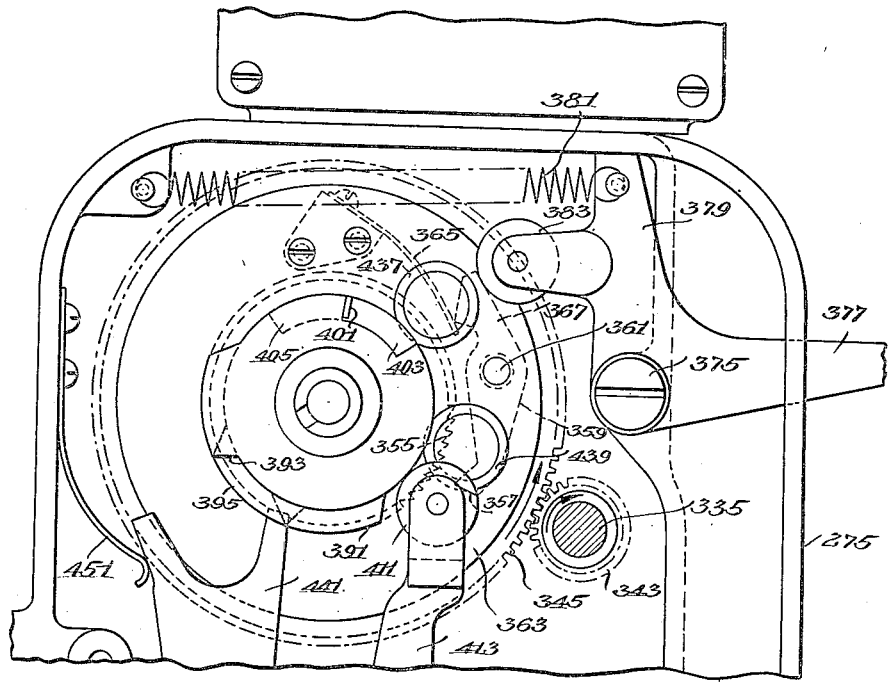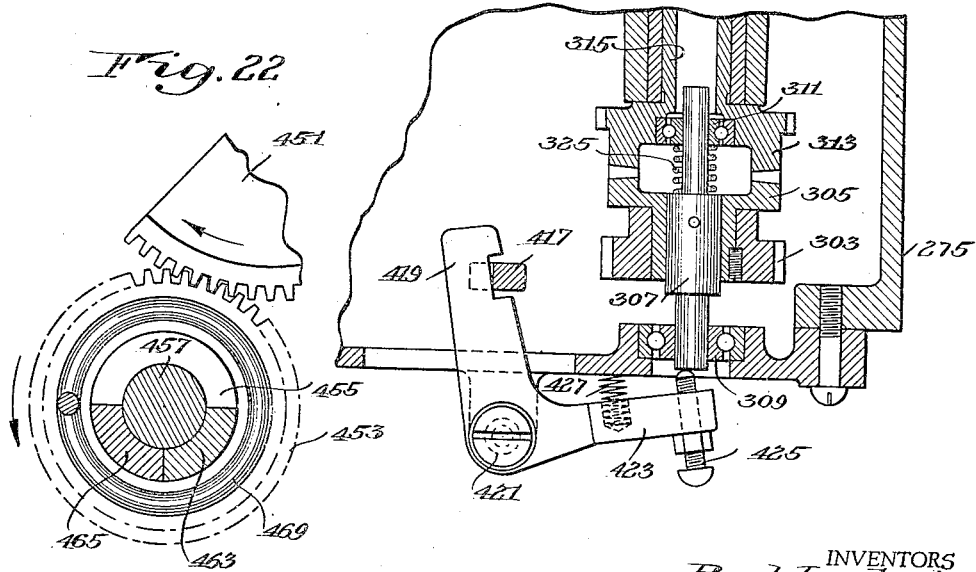

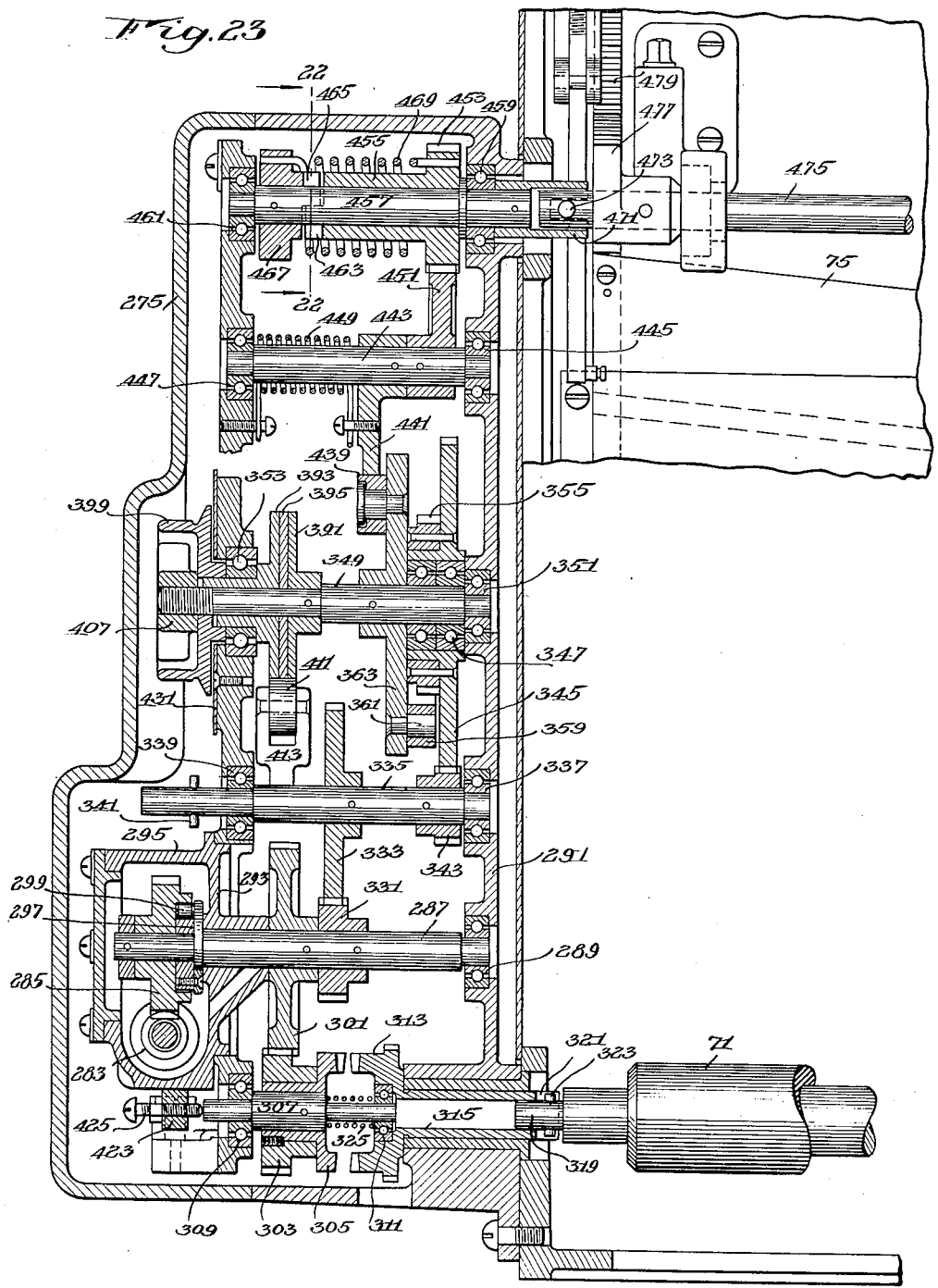

Patented Apr. 1, 1941

2,236,712

UNITED STATES PATENT OFFICE 2,236,712

FEEDING, SEVERING, AND CONTROLLING MECHANISM FOR PHOTOGRAPHIC COPYING MACHINES

Paul Landrock and Arthur W. Caps, Rochester, N. Y., assignors to Photostat Corporation, Providence, R. I., a corporation of Rhode Island Application April 29, 1939, Serial No. 270,856

23 Claims. (Cl. 88—24)

The present invention relates to photographic copying cameras or machines and more especially, although not exclusively, to machines of that type in which photographic exposures are made upon successive portions of a long strip of film supplied from a roll or the like, and in which each portion after being exposed is fed to a position out of the focal plane and cut off from the remaining unexposed film so that it may be developed, fixed, or otherwise treated. Machines of this general type are well known, various forms of such machines having been extensively marketed by the assignee of this present application, under the trade-mark "Photostat."

An object of the present invention is the provision of a generally improved and more efficient and satisfactory machine of the type above mentioned.

Another object of the invention is the provision of improved mechanism for feeding and severing the exposed film in machines of this general type.

Another object is the provision of feeding and severing mechanism of a type which can satisfactorily be controlled and operated from a remote point.

A further object is the provision of the above mentioned feeding and severing mechanism, in such form that it may be substituted for other and prior forms of feeding and severing mechanism at present in use on existing machines, without otherwise substantially altering the existing machines.

A further object is the provision of motor driven feeding and severing mechanism, so designed that the motor will not cause vibration of the machine during the exposing or picture taking part of the operation.

A further object is the provision of improved and more satisfactory control mechanism for controlling the exposing, film feeding, and severing operations of a photographic copying machine.

A still further object is the provision of control mechanism by means of which the operator may operate the shutter and the feeding and severing mechanism from a control station at the copyholder, so that the operator may remain stationed at the copyholder, in convenient position for arranging fresh pieces of copy to be exposed, and need not leave this position in order to operate the machine.

A still further object is the provision of control mechanism by which the shutter and the feeding and severing mechanism may be controlled from a still more remote point, such as an easel or wall on which a large article to be copied is placed, at some distance from the usual copyholder.

A still further object is the provision of simple and effective means for signalling or indicating to the operator the status or condition of various parts or operations, so that he may be guided by the information thus imparted to him, in performing certain operations.

Other objects of the invention are the provision of means for preventing operation of the feeding and severing mechanism during certain time intervals when it would be inadvisable to operate it, and the provision of optional means for operating the feeding and severing mechanism automatically at regularly recurring intervals.

To these and other ends the invention resides in certain improvements and combinations of parts, all as will be hereinafter more fully described, the novel features being pointed out in the claims at the end of the specification.

In the drawings:

Fig. 1 is a side elevation of a photo copying machine constructed in accordance with a preferred embodiment of the invention, viewed from one side;

Fig. 2 is a similar view of the machine viewed from the opposite side;

Fig. 3 is a plan thereof;

Fig. 6 is a wiring diagram illustrating the electrical circuit parts of the control mechanism;

Fig. 7 is a side view with parts broken away and parts in section, of a portion of the photo copying machine illustrating certain features of the film magazine, of the winding and severing mechanism, and of the control mechanism;

Fig. 8 is a face view of a fragment of the photographic film illustrating a splice therein;

Fig. 9 is a longitudinal section taken substantially on the line 9—9 of Fig. 8;

Fig. 10 is a vertical section taken substantially centrally through part of the machine;

Fig. 17 is a side elevation of a fragment of the machine illustrating the winding and severing mechanism, with the cover plate removed to show parts within, the mechanism being shown in its normal position of rest;

Fig. 18 is a similar view with the parts in a different and partially operated position;

Fig. 19 is a view of an electric switch associated with the feeding and severing mechanism in the position which it assumes while the feeding and severing mechanism is in operation;

Fig. 20 is a fragmentary view similar to the upper portion of Fig. 17 and showing the parts in the same position as Fig. 17, but with certain overlying parts removed to show the parts beneath;

Fig. 21 is a horizontal section taken substantially on the line 21—21 of Fig. 18;

Fig. 22 is a section taken substantially on the line 22—22 of Fig. 23, and

Fig. 23 is a diagrammatic section taken approximately on the line 23—23 of Fig. 17.

The same reference numerals throughout the several views indicate the same parts.

Figure 4:
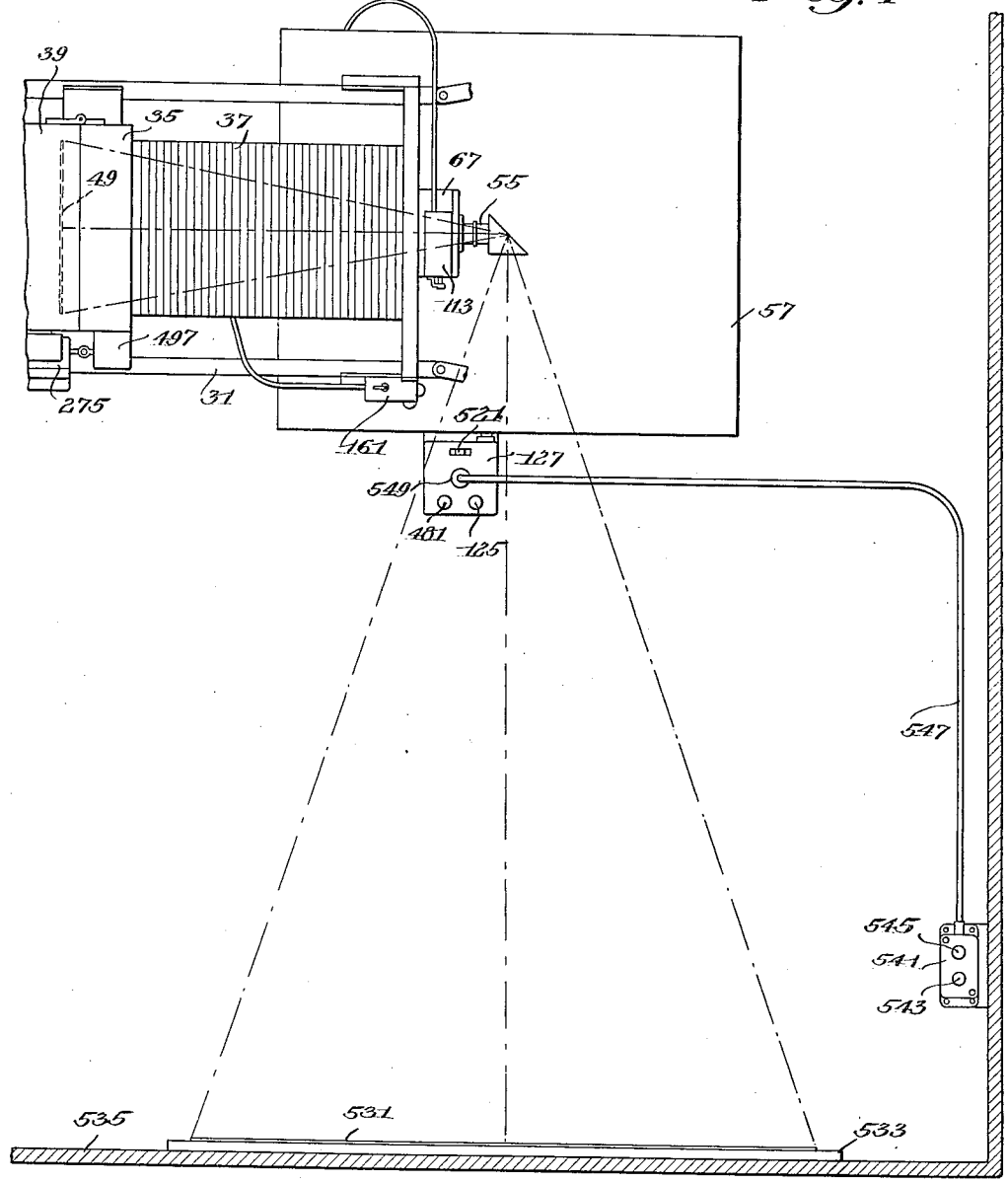
Fig. 4 is a plan of part of the machine shown in Figs. 1 to 3, illustrating the remote control mechanism used when photographing a large article to be copied, placed on a wall.

The present invention may be applied to various different kinds, types, or styles of photographic copying machines and similar machines, and is here described for the sake of an illustrative example in connection with a photographic copying machine of a type familiar in the art, which includes (Figs. 1–3) a framework 31 on which is mounted a camera front frame 33, a back frame 35, bellows 37 connecting these two frames to each other, and a magazine section 39 hinged to the section 35 by means of hinges 41, the back frame 35 and magazine 39 together constituting the main part of the camera body. In the magazine section may be placed the usual roll box 43 (Fig. 7) carrying a supply of unexposed sensitized photographic film 45 in the form of a roll, which film is preferably but not necessarily a strip of paper coated with the usual photographic emulsion. From the roll 45 the strip of film extends over a guide roll 47 and thence downwardly as indicated at 49 over the focal plane support sections 51 and 53, being held flat on these support sections in position to receive light rays entering the camera through a lens and prism assembly (Figs. 1–3) indicated in general at 55 and mounted on the front frame 33 of the camera.

Figure 12:
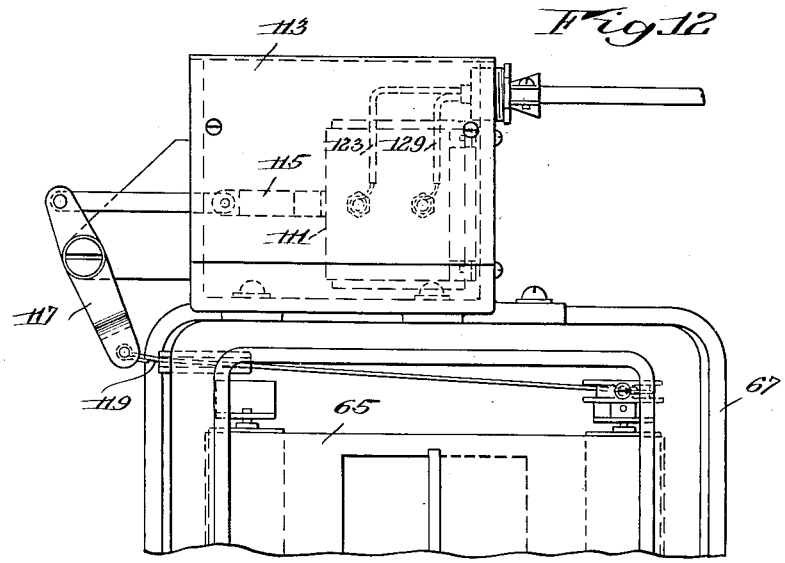
Fig. 12 is a diagrammatic view of the shutter operating mechanism.

The documents or other copy to be photographed may be laid on a suitable copyholder such as the board 57 mounted on a bracket 59 supported from the machine frame 31 and illuminated by a pair of lights 61, conveniently in the form of mercury tube lights, supported from swinging brackets 63 which also are mounted on the frame 31. Any suitable type of shutter, such as a curtain shutter 65 (Fig. 12) is mounted within the shutter casing 67 secured to the front frame 33. When this shutter is open, light rays reflected from the document or "copy" on the board 57, illuminated by the lights 61, pass upwardly to the prism forming part of the lens and prism assembly 55, and thence pass rearwardly through the lens and prism assembly, through the open shutter, through the bellows 37, and fall against the sensitized film 49 lying in the focal plane of the camera. Suitable adjustments of the relative positions of the copyholder 57, lens and prism assembly 55, and focal plane support 51, 53 are possible for purposes of accurate focusing.

After an exposure has been made, the exposed portion of the film 49 is fed downwardly by rotating feed rolls 71 and 73 (Figs. 7 and 10) until the top edge of the exposed area is slightly below the level of these feed rolls, this feeding motion bringing a fresh unexposed portion of film from the supply roll 45 into exposing position in the focal plane. The exposed portion of the film is then cut off from the remaining portion by operation of a severing knife 75 (Fig. 10) whereupon the severed exposed sheet, already hanging partially within the chute 77, drops to the bottom of the chute, its bottom edge resting against the bottom support 79 in the position indicated at 80 in Fig. 10. The lower edge of the sheet is then impaled upon forwardly extending pins 81 on the next passing one of a series of pick-up bars or pin bars 83 extending across the machine between a pair of conveyor chains 85 which are driven to carry the bars along a predetermined course. As the conveyor chains advance, the exposed sheet 80 is drawn out of the chute 77 and downwardly into and through successive treating baths, such as a developing bath within the tank 91 (Figs. 1, 2, and 10) and washing, fixing, and washing baths, respectively, within various compartments in the tank section 93, both tank sections being suspended from the side walls 95 of a developing compartment or chamber which is mounted on the frame 31. Finally, the developed, fixed, and washed print may be delivered to a print drier mounted within the casing 97 (Figs. 1 and 2). The conveyor chains 85 may be driven either intermittently or continuously, continuous driving being preferable when a machine of relatively large print making capacity is desired, and the driving may be done by means of an electric motor 99 (Fig. 1) mounted on the side of the compartment 95.

The parts thus far described are of conventional known construction, the details of which are unimportant so far as the present invention is concerned, and may be varied as desired. Greene Patent 1,822,345, granted Sept. 8, 1931, and Caps and Greene Patent 1,824,259, granted Sept. 22, 1931, disclose various features of machines of this general type in somewhat greater detail than the foregoing brief general description which is sufficient for present purposes.

If desired, the paper chute 77 may be provided with an indicator to indicate to the operator the presence of an exposed sheet within the chute 77, such indicator including a feeler arm 101 (Fig. 10) which corresponds to and functions in the same manner as the feeler arm 42 disclosed in Caps Patent 1,775,630, granted September 16, 1930. For indicating the approach of one of the pin bars or pick-up bars 83 toward the chute 77, the machine may also be provided with an audible signal such as a gong 103 (Fig. 10) sounded by a clapper 105 operated by an arm 107 lying in the path of travel of the pin bars, which parts may correspond respectively to the gong 30, clapper 39, and operating arm 42 disclosed in Caps Patent 1,824,258, granted Sept. 22, 1931.

In photo copying machines of this general type, the common practice is for the operator to arrange the articles to be copied on the copyholder 57, and then walk two or three steps to a position at the right side (that is, the side shown in Fig. 2) of the camera body, whereupon he operates various cranks or other instrumentalities to make an exposure, to operate the feed rollers 71 and 73 for feeding the exposed sheet material downwardly into the chute 77, and then to operate the knife 75 to sever the exposed sheet so that it drops to the bottom of the chute ready to be picked up by the next pin bar 83. Then the operator walks two or three steps back to a position at the copyholder 57, removes the document which has been photographed, places the next document in proper position, and again goes to a position beside the camera body to operate the shutter, the feeding means, and the severing means. It is seen that there is considerable lost motion and waste of time and effort in going back and forth from one position to another.

The present invention is designed to eliminate such lost motion and waste by providing suitable controls at a position adjacent the copyholder 57, so arranged that for normal operation, the operator need not leave his station beside the copyholder 57 but may perform all necessary operations of arranging the documents to be copied, operating the shutter, and operating the feeding and severing mechanism, all from a single convenient position near the copyholder. The present invention also provides remote control mechanism of such form that the necessary operations can be performed from a more distant point, when the article to be copied is too large to be placed on the regular copyholder 57 and when it is accordingly placed on a wall or other holder at a substantial distance from the camera.

In order to accomplish these desirable improvements, there is involved the provision of satisfactory means for operating the shutter from the desired station, means for indicating to the operator the time intervals during which it is permissible to operate the shutter and the time intervals during which it is undesirable to operate it, means for indicating to the operator the time intervals within which it is permissible to operate the feeding and severing mechanism and the time intervals when such operation is undesirable, improved motor driven feeding and severing mechanism, means for controlling the feeding and severing mechanism from a distance, and auxiliary remote control means for operating the shutter and the feeding and severing mechanism from a still more remote point. These various principal features which contribute to the accomplishment of the aims of this invention will now be individually described in the same order in which they have just been mentioned.

*Shutter operating mechanism*

The shutter is operated preferably by electric means such as the solenoid 111 (Fig. 12) in a casing 113 mounted on the top of the shutter casing 67. When the solenoid is electrically energized it pulls the core 115 to operate a lever 117 to pull the control cord 119 connected therewith, which opens the shutter. When the solenoid is deenergized a suitable spring (not shown) closes the shutter. The length of time during which the solenoid remains energized determines the length of time that the shutter remains open. The photographic film used in copying machines of this kind usually has a relatively slow emulsion, so that ordinarily the exposure is of several seconds duration.

Referring now to the wiring diagram constituting Fig. 6, current is supplied from any suitable source of supply, such as the usual electric lighting circuit, to the main wires 121 and 123 which constitute opposite sides of the circuit, and which may terminate in a conventional plug which may be plugged into any suitable electric socket. The wire 121 leads to one side of the contacts of an electric switch, preferably in the form of a push button 125 mounted in a control box 127 which is mounted on and supported by the bracket 59 which holds the copyholder 57, as shown, for example, in Figs. 2 and 3. A wire 129 leads from the other side of this push button 125 to the shutter control solenoid 111. The other main circuit wire 123 leads to the other side of the solenoid 111. When the button 125 is pushed, the circuit is completed, and the current flows from the leads 121 and 123 through the solenoid 111, and maintains the shutter open as long as the button 125 remains actuated. When the button is released, the shutter closes.

*Shutter signals*

There are two signals or indicators for informing the operator at what times it is proper to operate the shutter and what times such operation is inadvisable. The first of these is the film splice or exhaustion indicator, which will now be described.

Frequently, for manufacturing convenience and economy, it is necessary that the long strip of film supplied on the roll 45 (Fig. 7) have one or more splices therein, instead of being a single continuous integral strip. It is undesirable to make photographic prints from the sections of the film which contain these splices, as doing so would result in a splice across the finished photographic print. It is advisable, therefore, to provide mechanism for indicating to the operator the arrival of a splice at or near the focal plane, so that the spliced part of the film can be fed forwardly, cut off, and discarded, instead of being photographed upon.

The splice indicator, which also indicates the exhaustion of the film as well as splices therein, is not novel per se, but is new in combination with the other features of the present invention. The splice and exhaustion indicator may be of any of the forms disclosed in Landrock Patent No. 2,109,373, granted February 22, 1938. The form of construction disclosed in Fig. 7 of that patent is here indicated by way of example, in Fig. 7 of the present drawings, and includes a feeler arm 131 resiliently mounted so that its end 133 tends to pass through the plane of the photographic film 49 at a point near the top of the exposure area or focal plane area, and in longitudinal alinement with certain notches or openings 135 (Figs. 8 and 9) associated with each splice 137 in the film strip 49. Normally, the unbroken strip of film holds the feeler 131 in the position shown in Fig. 7 of the drawings of this application, and in Fig. 7 of the drawings of said Landrock patent. But when one of the openings or notches 135 associated with a splice reaches the end 133 of the feeler 131, then this end passes through such opening, to the position indicated in Fig. 8 of the drawings of said Landrock patent, bringing the feeler 131 into engagement with a contact piece 141 to close an electric contact to signal the presence of the splice to the operator.

Referring now to the wiring diagram in Fig. 6, there is indicated at B any suitable source of current of low voltage, such as a battery, or a transformer for producing low voltage current from the usual lighting circuit. From this source of current B one wire 145 leads, through a switch 147, to a branch 149 connected to the feeler member 131. From the companion contact piece 141 of the splice indicator, a wire 151 leads to one side of an electric lamp 153 and also to one side of an audible signal, such as a buzzer 155. A wire 157 leads from the other side of the lamp 153 and the other side of the buzzer 155 back to the source of current B. When the lamp 153 is lit, light shines through a red lens or bull's-eye 159 in a wall of the casing 161 which contains the lamp and buzzer and which is mounted in a conveniently observable position, such as on the front frame 33 as shown in Figs. 2, 4, and 6.

Assuming that the switch 147 is closed, then whenever operation of the feeding mechanism feeds a splice past the feeler 131, the lamp 153 will flash on twice, and the buzzer 155 will sound twice, due to the two notches or openings 135 associated with the splice. The operator then knows that it is not safe to make another exposure until he is sure that the spliced portion of film has been fed onward past the exposure area, so he operates the feeding means once or twice more without making an exposure, after which normal exposing and feeding operations may be resumed. When the supply of film is exhausted and the rear edge of the film moves past the feeler 131, the feeler will also operate to close the circuit and light the light 153 and sound the buzzer 155, but instead of coming on twice and then going off again, the lamp and buzzer will remain on continuously. The operator then opens the switch 147 to turn off the light and buzzer, opens the magazine section 39 of the camera, inserts a fresh supply of film, threads it properly down over the focal plane support sections 51 and 53 and between the rollers 71 and 73, closes the magazine and again closes the switch 147, whereupon the machine is ready for resumption of operation.

If a feeding operation should happen to bring one of the openings 135 in the film just to the feeler 131 and stop with the opening opposite the feeler, there would be a continuous operation of the light 153 and buzzer 155 similar to the case of exhaustion of the film. But whenever there is continuous operation rather than two intermittent operations, the operator can easily test whether this signifies exhaustion of the film or merely a splice, by operating the feeding means once more. If it is merely a splice which has happened to stop with one of the openings 135 opposite the feeler, the next operation of the feeding means will, of course, move this opening 135 onward past the feeler, and the light 153 will go out. But if the film has been exhausted, then a further operation of the feeding means will not extinguish the light 153, and the operator will then follow the above indicated procedure for replenishing the supply of film.

The second of the two signals or indicators for informing the operator at what times it is proper to operate the shutter and at what times such operation is inadvisable, comprises indicating means coupled with the feeding and severing mechanism to show the operator when the feeding and severing mechanism is being operated and when it is not being operated. It is inadvisable to operate the shutter during operation of the feeding and severing mechanism for two reasons. First, any exposure made while the feeding mechanism is in operation will, of course, be spoiled, because the film is being moved over the exposure area at that time. Second even if the feeding and severing mechanism has finished the feeding part of the operation and is performing only the severing part, the operation of the severing knife may cause some vibration of the camera and result in a blurred print, so that it is advisable not to operate the shutter until the operation of the feeding and severing mechanism is entirely finished.

To inform the operator of the condition of operation or non-operation of the feeding and severing mechanism, there is provided, in conjunction with this machanism, a switch having a set of companion contacts 171 (Figs. 6 and 19) which are connected to each other by a contact member 173 to close the switch when the feeding and severing mechanism is not in operation, and which are open or unconnected to each other when the feeding and severing mechanism is in operation, this being accomplished in a manner to be explained below. The previously mentioned line wire 145 from the source of current B has a branch 175 (Fig. 6) leading to a junction box 177 and thence to one of the switch contacts 171. There is a wire 179 leading back from the other switch contact 171, through the junction box 177, to one side of the lamp 181 mounted in the same casing 161 with the lamp 153, the light when lit illuminating a yellow lens or bull's-eye 183. The previously mentioned wire 157 from the opposite side of the source of current B leads to the opposite side of the lamp 181, completing the circuit. Whenever the switch 171 is closed (that is, whenever the feeding and severing mechanism is not in operation), the light 181 is illuminated, and lights up the yellow lens 183 to indicate to the operator that, so far as the feeding and severing mechanism is concerned, he is free to operate the shutter if he so desires. In connection with the shutter operation, the operator should consider both the red light 159 and the yellow 183. Whenever the red light 159 is on, or has recently indicated the presence of a splice which has not yet been effectively removed from the focal plane, it is not safe to operate the shutter But, so long as the red light 159 is out and all splices previously indicated thereby have been fed onwardly beyond the focal plane, it is safe to operate the shutter whenever the yellow light 183 is lit.

*Indicating mechanism for feeding and severing operation*

Indicating mechanism is provided for informing the operator of the time intervals during which it is permissible to initiate operation of the feeding and severing mechanism. Such indicating means is desirable because there are certain times in the operation of the machine when it may be inadvisable to operate the feeding and severing mechanism. In machines in which the conveyor chains 85 are driven continuously to carry the pin bars 83 continuously through their paths of travel, it would be inadvisable to feed sheet material downwardly into the chute 77 (Fig. 10) at such a time that it would reach the bottom of the chute just as one of the pin bars arrives at the chute, for the film would then immediately be impaled on the pin bar and be drawn along thereby before the knife 75 had a chance to sever the film. Hence, as one of the pin bars 83 approaches the bottom of the chute 77, there comes a time during such approach, after which the feeding and severing mechanism should not be set into operation, until that pin bar has safely passed the chute.

Figure 11:
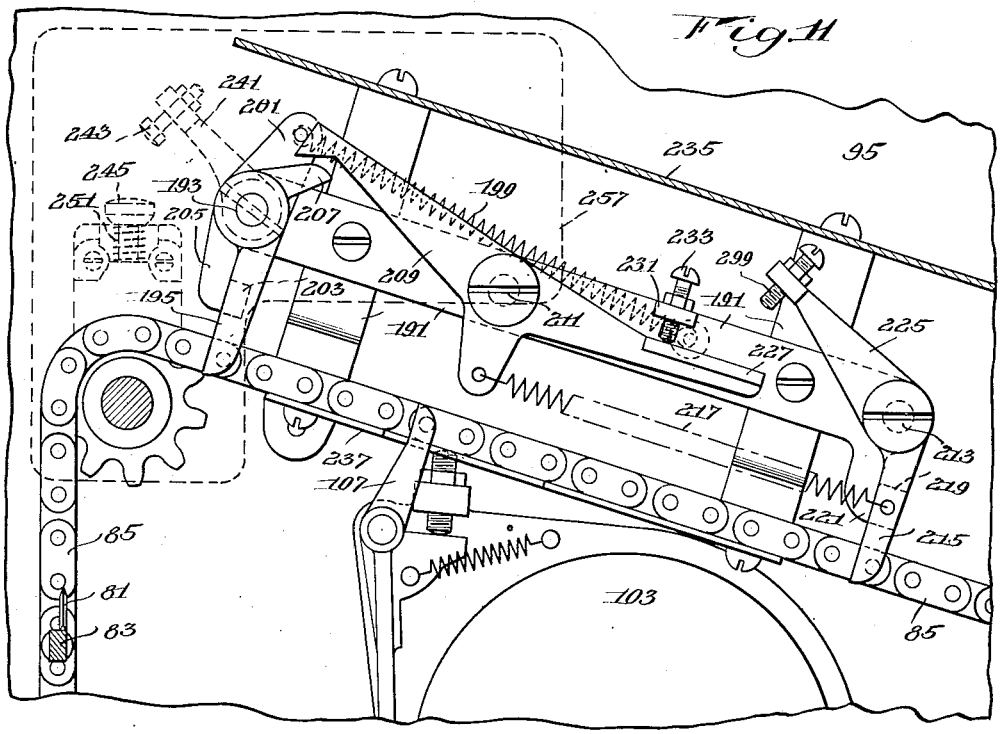
Fig. 11 is a side elevation of part of the control mechanism shown in Fig. 10, with a covering plate removed to show the parts beneath.
Figure 13:
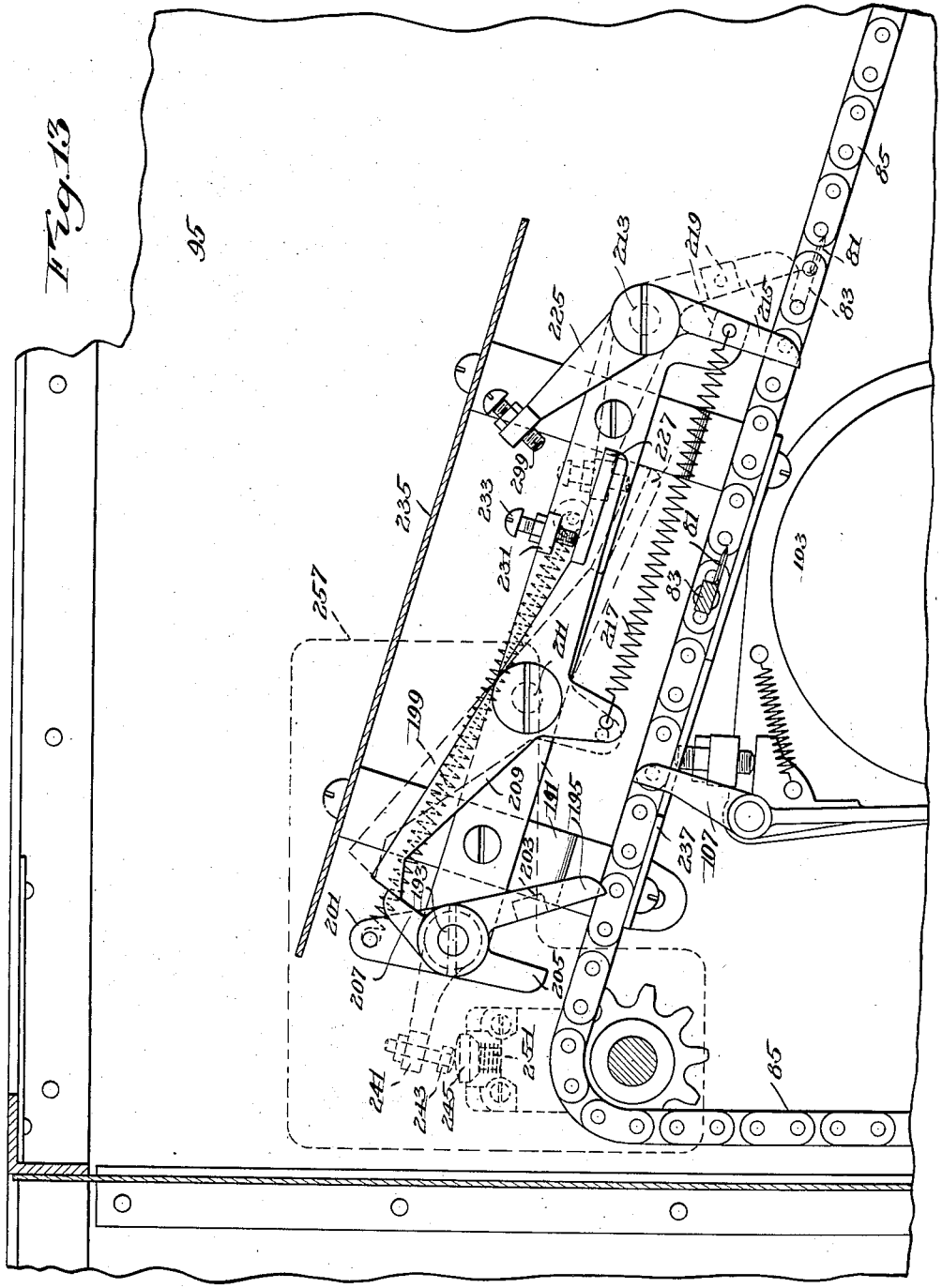
Fig. 13 is a view similar to Fig. 11 showing the parts in a different position.

In order to signal to the operator the time intervals when it is permissible and the time intervals when it is inadvisable to operate the feeding and severing mechanism, there is provided on one side of the machine, on the inner face of the compartment wall 95, a bracket indicated in general at 191 (Figs. 10, 11, and 13). On this bracket is mounted a short transverse shaft 193 which extends rotatably through the side wall 95 in a light-tight manner. Near the inner end of this shaft 193 is fastened a depending arm 195, the lower end of which lies in the path of travel of the pin bars 83. A coiled tension spring 199, secured at one end to the stationary bracket 191 and at the other end to an arm 201 fixed to the shaft 193, constantly tends to turn the shaft clockwise to a position in which a lug 203 projecting laterally from the trip arm 195 comes to rest against a fixed arm 205 on the bracket 191.

The shaft 193 also carries an arm 207 secured to the shaft in such position that when the trip arm 195 is moved counterclockwise by contact with one of the pin bars 83, from the position shown in Fig. 11 to the position shown in Fig. 13, this arm 207 will snap past the end of a detent lever 209 pivoted to the bracket 191 at 211, and the detent lever 209 will retain the arms 207 and 195 in this position shown in Fig. 13, until the detent is stripped or released.

The release of the detent is accomplished by means of a bell crank lever pivoted to the bracket 191 at 213, and having a depending arm 215 lying in the path of travel of the pin bars 83, at a point some distance beyond the arm 195, so that each pin bar during its travel will reach the arm 215 at a substantial interval after it passes the arm 195. This bell crank arm is normally held in the position shown in Fig. 11, and in full lines in Fig. 13, by means of a coiled tension spring 217 connected to the arm and constantly tending to rotate the arm clockwise until a laterally projecting lug 219 thereon comes into contact with the lug 221 on the bracket 191. The opposite end of this same spring 217 may be connected to the detent lever 209, as shown, to tend to hold this detent lever constantly in latching position.

The other arm of the bell crank lever connected to the first arm 215 thereof is indicated at 225. It overlies a suitable bearing surface 227 on the detent lever 209 in such position that when a pin bar passes the arm 215 of the bell crank and moves this arm counterclockwise, the other arm 225 will cause a downward thrust on the part 227 of the detent lever 209, raising the opposite end of the lever and releasing it from the arm 207 on the shaft 193 so that the spring 199 can restore this shaft in a clockwise direction to its initial or normal position. Preferably the arm 225 does not itself contact directly with the part 227 of the detent lever, but carries an adjusting screw 229 to make contact with the detent lever, so that by adjusting this screw the detent lever 209 may be made to release the arm 207 when the bell crank lever 215, 225 reaches the desired angular position. Preferably also a stationary lug 231 on the bracket 191 carries an adjusting screw 233 to contact with the bearing surface 227 on the detent 209 to form an abutment against which the detent lever is normally held by the action of the spring 217, thus determining the normal position of this lever.

A cover plate 235 secured to the bracket 191 extends inwardly from the side wall 95 of the compartment and thence downwardly in covering relation to most of the parts of the mechanism just described, as shown in Fig. 10. Also fixed to the bracket 191 is a laterally extending shelf 237 forming a support on which the adjacent conveyor chain 85 rides in order to prevent downward deflection of the chain by the resistance offered to the pin bars by the arms 195 and 215, when the pin bars pass these arms.

Figure 14:
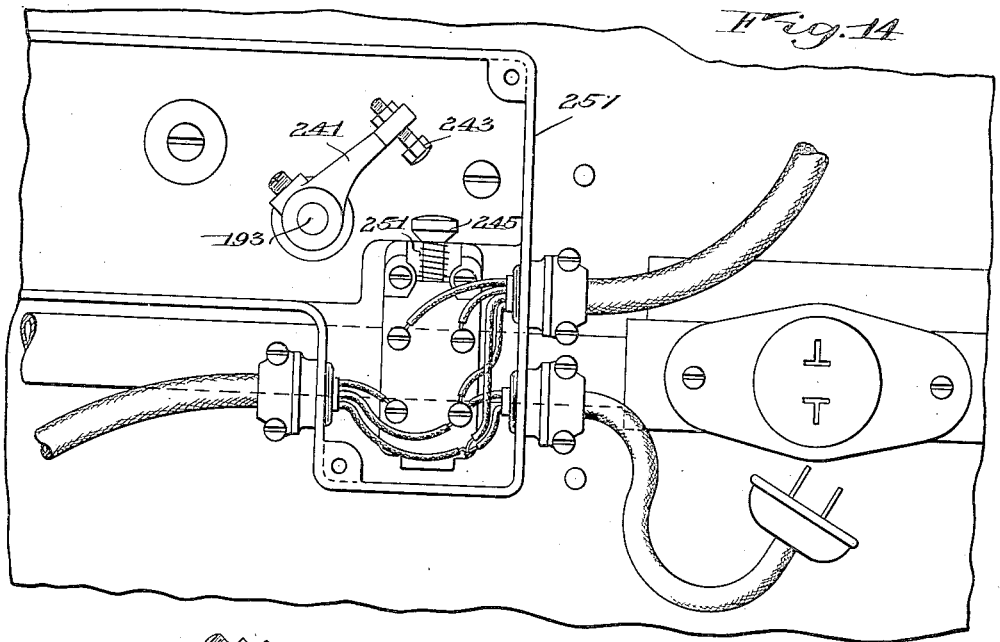
Fig. 14 is a side elevation of a fragment of the machine illustrating the electric switch operated by the mechanism shown in Figs. 11 and 13.
Figures 15, 16:
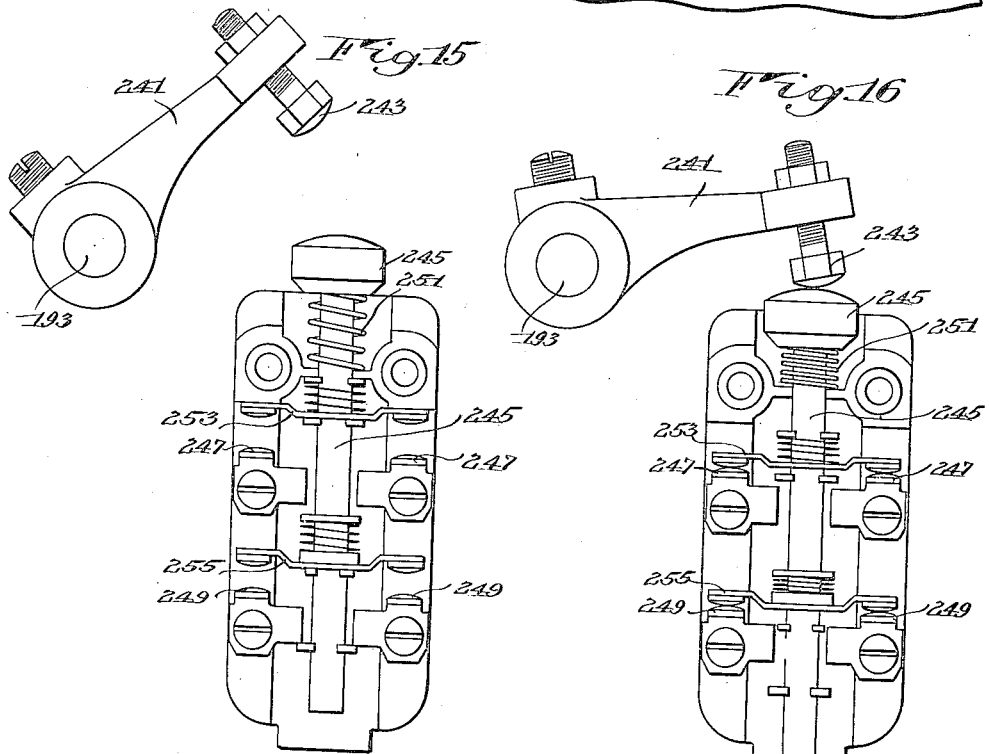
Fig. 15 is a larger view of the same switch in its normal or open position.
Fig. 16 is a similar view thereof in its closed position.

As above mentioned, the shaft 193 passes outwardly through the compartment wall 95. Near its outer end, this shaft carries an arm 241 shown in dotted lines in Figs. 6, 11, and 13, and in full lines in Figs. 14, 15, and 16. As best shown in the latter mentioned figures, this arm 241 carries an adjusting screw 243 which has its end in cooperative relation to the upper end of the operating plunger 245 of an electric switch of the plunger operated type. This switch is in effect two switches, having two pairs of electric contacts, the upper pair being indicated at 247 and the lower pair at 249. A coiled spring 251 surrounding the plunger 245 of the switch normally tends to push this plunger upwardly to the position shown in Figs. 11, 14, and 15, where two contact strips or connector bars 253 and 255 are elevated above and out of contact with the switch contacts 247 and 249, respectively, so that both pairs of switch contacts are unconnected or open. But when the shaft 193 is turned to move the arm 241 downwardly to the position shown in Figs. 13 and 16, it depresses the plunger 245 against the action of the spring 251, bringing the contact strip 253 down to make contact between the contact members 247, closing this switch, and also bringing the contact strip 255 down to make contact between the members 249, closing this switch also.

The entire switch and its operating arm 241 may be enclosed within a casing 257 (Figs. 1, 6, and 14) secured to the left side of the machine.

The action of these parts is as follows: Normally, the parts are in the position shown in Figs. 11, 14, and 15, with the switch plunger 245 in its elevated position and both pairs of contacts open.

During the advancing movement of the conveyor chains 85, whenever one of the pin bars 83 reaches the arm 195, it swings this arm in a counterclockwise direction, to the position shown in Fig. 13, which turns the shaft 193 and moves the arm 241 thereon downwardly to depress the switch plunger 245 and thus to close both pairs of contacts 247 and 249. As the pin bar 83 passes on beyond the arm 195, this arm nevertheless remains in position to keep the switch closed, because the arm 207 has become latched by the detent lever 209.

The switch remains closed until the advancing pin bar finally reaches the arm 215 of the bell crank lever. The pin bar then turns the bell crank lever from the full line position to the dotted line position shown in Fig. 13, so that it depresses the adjacent end of the detent lever 209, releases the detent from the arm 207, and allows the spring 199 to swing the shaft 193 back to its initial position, which raises the switch operating arm 241 and allows the spring 251 to open both switches 247 and 249.

Thus the switches are closed only during the interval that one of the pin bars 83 is traveling from the arm 195 to the arm 215, and the switches are open at all other times. This mechanism is so placed with respect to the travel of the pin bars that just as the rear end of an exposed sheet of maximum length is being drawn out of the chute 77 (Fig. 10) by one pin bar, the next following pin bar will reach and trip the arm 195 to close the switches 247 and 249. This pin bar will then reach the arm 215 to trip this arm and open the switches, at a time interval before it reaches the chute 77 which is just sufficient to allow a full cycle of operation of the feeding and severing mechanism and the dropping of the severed sheet to the bottom of the chute 77. In other words, the time of the travel of the pin bar from the bell crank arm 215 to the pick-up position at the bottom of the chute 77, is the minimum time required for winding down and severing a sheet and permitting the sheet to drop to the bottom of the chute. If operation of the feeding and severing mechanism were started after the pin bar had passed the arm 215, there would be danger that the sheet might not reach the bottom of the chute in time to be picked up by this pin bar.

It is seen from this explanation that the interval during passage of any one of the pin bars from the arm 195 to the arm 215 is the desirable time interval within which the feeding and severing mechanism should be operated, and after the pin bar has passed the arm 215, no operation of the feeding and severing mechanism should take place until the next succeeding pin bar reaches the arm 195. It is seen also that with the mechanism above described, the switches 247 and 249 are closed only during this interval in which it is desirable to operate the feeding and severing mechanism, and these switches are open at all other times.

Referring now to Fig. 6, the supply line 145 from the source of current B has a branch 261 leading to one of the switch contacts 247. From the other of these switch contacts a return wire 263 leads to one side of the lamp 265 in the casing 151. The other side of the lamp 265 is connected, in common with the corresponding sides of the lamps 153 and 181, to the return wire 157 leading to the other side of the source of current B. When this lamp is lit, it illuminates a green lens or bull's-eye 267. Whenever the operator sees that the green light is on, he knows that he may operate the feeding and severing mechanism, if he wishes to do so. When the green light is not showing, he knows that the feeding and severing mechanism should not be operated.

*Feeding and severing mechanism*

As best seen in Figs. 2 and 7, a casing 275 and an electric motor 279 are mounted on the right hand side of the magazine section 39 of the camera. Referring now to Fig. 17, the armature shaft 281 of the motor enters the casing 275 and carries a worm 283 meshing with and constantly driving a worm wheel 285 (see also Fig. 23) rotatably mounted on a shaft 287 journaled at its inner end on a ball bearing 289 on the inner wall 291 of the casing 275 and near its outer end on a bearing on a partition 293 forming part of a sub-casing 295 which tightly encloses the worm and worm gear within the main casing 275, so that this sub-casing may be partially filled with oil in order that the worm may run constantly in oil. There is a hub 297 fixed to the shaft 287, and a set of spring pressed rollers 299 placed in tapering grooves formed between the hub 297 and the gear 285, constitute a one-way clutch of a familiar kind, so that when the gear 285 is driven by rotation of the motor shaft 281, it will drive the shaft 287 in the direction shown by the arrow just above the worm 283 in Fig. 17. But when the motor is stationary, the shaft 287 may be turned in the same direction by other means, because of the clutch arrangement.

Fixed to and rotating with the shaft 287 is a gear 301 (Fig. 23) meshing with a gear 303 (Figs. 21 and 23) fixed to a clutch element 305 pinned on a shaft 307 which is slidable longitudinally through a ball bearing 309 near its outer end, mounted on a fixed partition in the casing 275, and through a ball bearing 311 near its inner end, this second ball bearing being mounted in a hollow clutch element 313 formed integrally with or fixed to a hollow sleeve 315 rotatable in but held against axial movement in a bearing in the fixed wall 291 of the casing 275. The inner end of this sleeve 315 receives a reduced end 319 (Fig. 23) of the shaft which carries the feeding roller 71, and an axial slot 321 in the sleeve 315 receives a cross pin 323 on the roller shaft to constitute a driving connection between the sleeve 315 and the roller 71, which can, however, be instantly disconnected by endwise movement of the sleeve 315 away from the feeding roller shaft, whenever it is desired to take the casing 275 off of the magazine section for repairs or adjustment.

A coiled compression spring 325 surrounds the shaft 307 between the two clutch members 305 and 313, and constantly tends to press them apart to the position indicated in Fig. 23. Endwise pressure on the shaft 307 in a rightward direction when viewed as in Fig. 23 will, however, shift the entire shaft and the gear 303 and element 305 (without unmeshing the gear 303 from the gear 301, however) until clutch teeth formed on the face of the clutch element 305 mesh with corresponding clutch teeth on the face of the clutch member 313, as shown in Fig. 21, to establish a driving connection between these parts. Then, the gear 303 being turned by the gear 301, the clutch member 313 will be driven, and with it the sleeve 315 and the feeding roller 71. The extent of turning of the roller 71 and, consequently, the length of the strip of film which is fed thereby, will depend, for any given speed of rotation, upon the length of time that the clutch elements 305 and 313 remain in mesh with each other, which in turn depends upon the length of time that sufficient axial pressure on the shaft 307 is maintained. The means for producing such axial pressure is variable or adjustable, in order that the mechanism may be set for winding different lengths of film at each operation, as will now be described.

Referring now to Figs. 17 and 23, the shaft 287 carries also a gear 331 fixed thereto and rotating therewith, which meshes with a gear 333 fixed to a shaft 335 journaled in ball bearings 337 in the wall 291 and 339 in a fixed intermediate partition in the casing 275. As best seen in Fig. 23, the outer end of the shaft 335 projects outwardly beyond the bearing 339 and is provided with a cross pin 341, so that if the driving motor 279 should fail, the outer plate or cover plate of the casing 275 can be removed and a hand crank can be placed on the exposed end of the shaft 335 to make driving engagement with the cross pin 341, and the feeding and severing mechanism can be operated by means of the hand crank, rotation of the parts being permitted by the one-way or overrunning clutch 299 previously mentioned.

The shaft 335 also has fixed to it a pinion 343 meshing with a gear 345 freely rotatable on ball bearings 347 on a shaft 349 which itself is rotatable on ball bearings 351 in the wall 291 and 353 in a fixed partition in the casing 275. The gear 345 has fixed to it a ratchet 355 (Figs. 20 and 23) for cooperation with the end 357 of a pawl 359 pivoted at 361 to a disk 363 fixed to the shaft 349. A leaf spring 365 also fixed to the disk 363 presses against the opposite end 367 of the pawl 359, in a direction tending to throw the nose of the pawl into engagement with the ratchet teeth 355 to establish a driving relation between the pawl and the ratchet, so that the rotation of the gear 345 and ratchet 355 will correspondingly drive the disk 363.

The periphery of the disk 363 is of smooth circular form except at one point where there is a notch 371 (Fig. 18) arranged alongside of the tail 367 of the pawl 359. A bell crank lever pivoted in the casing 275 at 375 has one laterally extending arm 377 and another upwardly extending arm 379, constantly pulled in a leftward or counterclockwise direction, when viewed as in Figs. 17, 18, and 20, by a coiled tension spring 381 one end of which is secured to the arm 379 and the other end to a fixed part of the casing 275. This arm 379 also carries a small roller 383 which rides on the periphery of the disk 363. When the disk rotates to a certain point, the roller 383 drops into the notch 371 and the face of the roller is sufficiently wide so that it contacts also with the tail 367 of the pawl and presses this tail radially inwardly toward the shaft 349, against the action of the spring 365, throwing the nose 357 of the pawl out of engagement with the ratchet teeth 355 to break the driving connection between the ratchet and the disk 363. The spring 381 is stronger than the spring 365 in order to accomplish this disengagement of the pawl against the action of the latter spring.

When the parts are at rest, they are in the position shown in Fig. 20, with the roller 383 seated in the notch in the disk 363. A clockwise movement of the bell crank lever 377, 379 against the tension of the spring 381 will lift the roller 383 out of the notch in the disk 363 and at the same time release the tail 367 of the pawl so that the spring 365 will throw the nose 357 into engagement with the ratchet teeth 355. Assuming that the motor 279 is running, the ratchet 355 will at this time be turning in a counterclockwise direction as shown by the arrow in Fig. 20, and when the pawl 359 comes into contact with the ratchet teeth, the disk 363 on which the pawl is mounted will likewise begin to turn in a counterclockwise direction.

As soon as it has turned a small fraction of a revolution, so that the notch 371 is beyond the roller 383, the displacing force on the bell crank lever 377, 379 can be removed and the spring 381 will carry the roller 383 into contact with the periphery of the disk, and the roller will ride around the smooth circular part of the periphery until exactly one revolution is completed, whereupon the notch 371 and the tail 367 of the pawl both again come around to the roller 383. The roller then drops into the notch, at the same time pressing inwardly on the tail of the pawl and releasing the pawl from the ratchet 355, so that the driving connection between the disk and the ratchet is broken, the disk comes to rest (the roller 383 cooperating with the notch 371 to act as a spring detent to hold the disk always in the same definite position when at rest) and the ratchet 355 may continue to turn without causing any further turning of the disk 363 until the bell crank lever is once more displaced to move the roller 383 out of its notch, whereupon the parts are once more rotated through a single complete revolution.

It will be remembered that the ratchet 355 and gear 345 are rotatably mounted on the shaft 349 and consequently the shaft does not necessarily turn with them, but does turn with the disk 363 which is pinned to the shaft. Hence the shaft 349 will, at each cycle of operation, rotate through exactly one revolution, and will then come to rest always in the same position, at the completion of one revolution.

The shaft 349 is provided with an adjustable cam for determining that part of the cycle of operation during which the clutch elements 305 and 313 are engaged with each other to cause driving of the feeding roller 71. The cam, in its preferred form, comprises one cam segment 391 (Figs. 18, 20, and 23) pinned to the shaft 349, a second cam segment 393 having a hub rotatable on the shaft 349, and a third cam segment 395 between the other two. Each of these cam segments has an effective periphery or portion of larger radius which extends through only a minor part of a complete circle, and an ineffective periphery or portion of smaller radius which extends through the rest of the circumference, with a short angular or oblique edge between the two.

By turning the cams 393 and 395 so that their effective peripheries overlie and coincide with that of the cam 391, the composite cam will be of minimum length. The length of the effective cam surface can be adjusted to any desired extent from this minimum length up to the maximum where the effective surface of one cam begins just at the point where the other stops, the cam 395 continuing on from the end of the cam 391, and the cam 393 continuing on from the end of the cam 395. This adjustment may be effected by means of an adjusting knob 399 (Figs. 17 and 23) connected to the hub of the cam 393, so that by turning this knob 399 the cam 393 is turned in one direction or the other on the shaft 349, which is stationary at this time. The cam 395 floats between the cams 391 and 393 and is provided with a lateral lug 401 (Fig. 18) engaging in an arcuate notch 403 in the cam 393, and a similar lateral lug engaging in a similar arcuate notch 405 of the cam 391, this arrangement of lugs and notches serving to limit the rotation of one cam element relatively to another, and preventing the cams from being spread too far. When they are adjusted to the desired position by turning the knob 399, they may be clamped in this position by a clamping nut 407 threaded on the end of the shaft 349, which, when tightened, will bear against the adjusting knob 399 and hold this knob against rotation relatively to the shaft 349, so that the clamping nut 407, knob 399, and the composite cam elements 391, 393, 395 will all turn together as a unit with the shaft 349 when the latter turns.

Cooperating with the composite cam and riding on the periphery thereof is a roller 411 (Figs. 18, 20, and 23) mounted on the upper end 413 of a lever pivoted at 415 (Figs. 17 and 18) on a fixed part of the casing 275. The lower end 417 of this lever (Figs. 18 and 21) lies just forwardly of and engages an inwardly extending arm 419 of a bell crank lever pivoted at 421 on the casing 275. Another arm 423 of this bell crank lever extends forwardly and is provided with an adjusting screw 425 which may press against the outer end of the shaft 307 which carries the clutch element 305, as best shown in Fig. 21. A compression spring 427 tends to turn the bell crank lever 419, 423 in a clockwise direction when viewed from above as in Fig. 21, holding the arm 419 thereof against the arm 417 of the vertical lever in such a way as to hold the roller 411 against the periphery of the composite cam.

As above mentioned, the shaft 349 and the composite cam elements mounted thereon come to rest, at the end of a cycle, always in a predetermined position (shown in Fig. 20) in which the roller 382 lies in the notch 371. In this position, the forward or leading edge of the first cam element 391 lies a short distance away from the roller 411, ready to displace this roller soon after rotation of the shaft 349 commences. When this roller 411 rides up the inclined leading edge of the cam and is displaced to a position farther away from the shaft 349 (such a position being shown in Fig. 18) this swings the lever 413, 417 about its pivot 415, which in turn swings the bell crank 419, 423 about its pivot 421, causing the screw 425 to press inwardly on the shaft 307 to engage the driving clutch element 305 with the driven clutch element 313 and establish a driving relationship between these elements so that the feeding roller 71 is rotated. The extent to which the feeding roller is rotated depends upon the setting of the composite cam, for as soon as the roller 411 drops off of the trailing edge of the last cam element 393, the spring 427 is permitted to return the vertical lever 413, 417 and the bell crank lever 419, 423 to their initial positions of rest, and the spring 325 opens the clutch 305, 313 to break the driving connection so that rotation of the feeding roller 71 ceases, even though the clutch element 305 may continue to turn.

By adjusting the composite cam to make it longer or shorter, the extent of turning of the feeding rollers 71 for each cycle of operation is altered as desired. To assist in adjusting it for any desired extent of feeding, there may be provided a dial plate 431 (Figs. 17 and 23) mounted stationarily on a fixed partition in the casing 275, which dial plate is provided with graduations 433 (Fig. 17) of any appropriate kind, preferably reading directly in terms of inches or fractions of an inch, and cooperating with an index mark 435 on the adjusting knob 399. When the adjusting knob is turned (the shaft 349 being stationary in its normal position of rest) to such position that the index mark 435 is opposite the graduation marked 24, this means that the composite cam is adjusted to such length that the roller 71 will be rotated sufficiently to feed 24 inches of the length of the film at each cycle of operation. Similarly, if the index mark 435 be placed opposite one of the other graduations, this will make the composite cam of the proper length to cause rotation of the roller 71 to an extent just sufficient to feed the length of film indicated by the particular graduation 433 which is opposite the index 435. With the arrangement here shown as an illustrative example, the feeding can be set for any desired length between a maximum of 24 inches and a minimum of 14 inches.

The severing mechanism for cutting the film at the completion of the feeding operation is controlled from this same mechanism within the casing 275 which has been described in connection with the feeding of the film. The above mentioned disk 363 which is fast to the shaft 349 carries two rollers 437 and 439 (Figs. 18, 20, and 23) mounted on studs projecting from that face of the disk which is remote from the ratchet 355. These rollers cooperate with a forked arm 441 fixed to a shaft 443 journaled in ball bearings 445 and 447 mounted on fixed parts of the casing 275. A spring 449 coiled around the shaft 443 and having one end pressing against a fixed abutment and the other end against an abutment on the arm 441, tends constantly to turn the shaft 443 in a counterclockwise direction when viewed as in Figs. 17 and 18, and to hold it against a resilient stop provided by a leaf spring 451 which cushions the return movement of this lever after it has been moved away from its normal position, but which is stronger than the spring 449 in order to provide a definite normal or rest position for the arm 441.

This rest position is such that, at the latter part of the operating cycle represented by one complete revolution of the shaft 349, and after the completion of the feeding movement of the roller 71, the roller 437 will come into contact with the arm 441, being received in the notch at the upper end thereof, and will press rightwardly against the right hand branch of this arm to turn this arm in a clockwise direction about its shaft 443, against the tension of the spring 449. Just as the roller 437 is about to move past the end of the arm 441, the second roller 439 will come around into contact with the arm, this time against the left hand branch of the arm (when viewed as in Fig. 18), and will turn the arm 441 still further in a clockwise direction. The maximum turned position of the arm is indicated in dotted lines in Fig. 18, where the roller 439 is also shown in dotted lines at 439a, in the position it assumes just before it passes beyond the end of the arm 441 and permits the arm to return to its initial position under the influence of the spring 449.

This clockwise swinging of the arm 441 and corresponding turning of its shaft 443 operates the severing knife 75 (Fig. 10) to cut off the film which has been fed downwardly by the roller 71, at a point just beneath this roller. The shaft 443 has fixed to it a gear segment 451 (Figs. 17, 18, and 23) which meshes with a gear 453 formed on a sleeve 455 rotatable on a shaft 457 rotatable in ball bearings 459 and 461 mounted in fixed parts of the casing 275. At its outer end the sleeve 455 has a lug 463 (Figs. 22 and 23) occupying but a small part (preferably about a quarter or less) of a full circle and cooperating with a similar lug 465 on a collar 467 pinned to the shaft 457. A coiled spring 469 surrounds the sleeve 455 and has one end fixed thereto and the other end fixed to the collar 467, the force of the spring being such as to tend to turn the sleeve 455 in a clockwise direction when viewed from its outer end as in Figs. 18 and 22, and to tend to turn the collar 467 in a counterclockwise direction when viewed in the same way, thus holding the lugs 463 and 465 tight against each other as indicated in Fig. 22.

When the shaft 443 is swung in a clockwise direction (viewed from the outer end as in Fig. 18) by the action of the rollers 437 and 439, the gear segment 451 turns the gear 453 in a counterclockwise direction (as shown by the associated arrow in Fig. 22) and this tends to turn the collar 467 and the shaft 457 correspondingly in a counterclockwise direction, because the spring 469 tends to hold the lug 465 on the collar 467 tight against the lug 463 as the latter turns with the gear 453. But if there is any unusual resistance to turning the shaft 457, then the gear 453 can continue to turn to the end of its range of travel without the collar 467 and shaft 457 necessarily turning with it, for in the event of such unusual resistance, the collar 467 and its lug 465 can remain stationary and the lug 463 can pull away from it and turn around approximately half a revolution in a counterclockwise direction (Fig. 22) relatively to the lug 465, simply winding up the spring 469 somewhat tighter and causing no damage to any parts.

The shaft 457 is connected in any suitable way to the film severing knife 75 previously mentioned. For example, the inner end of the shaft 457 may have a sleeve 471 (Fig. 23) fixed thereto, which sleeve has a slotted end similar to the sleeve 315, to cooperate in the same way with the cross pin 473 on the outer end of the knife operating shaft 475, which shaft is connected to the knife to reciprocate it by any suitable means, such as a pair of gear segments 477 fixed to the shaft 475 near opposite ends thereof at opposite sides of the machine (only one end being shown in Fig. 23) and meshing with racks 479 on a reciprocating carriage which carries the knife blade 75.

The spring 469 is of sufficient strength to hold the lugs 463 and 465 in contact with each other and cause operation of the knife blade 75 through its full range of travel under all normal conditions. If, however, the film should become jammed in the knife or for any other reason there should be an unusual resistance to the operation of the knife, then the spring 469 would give, as above mentioned, so that the knife could stop without completing its full travel and yet the various operating parts above described would not be broken.

The feeding roller shaft 319 and the knife operating shaft 475 are shafts which exist, at a standard distance from each other, in many commercial copying cameras now in use. According to the present invention, the casing 275 and all parts included therein are made of such size and proportions that the shaft-receiving sleeves 315 and 471 are at this same standard distance from each other. It is an easy matter to remove the present means for operating the feeding roller shaft 319 and knife shaft 475 from the existing machines already in use, and to place the casing 275 containing the improved operating mechanism against the side of the machine in proper position so that the sleeves 315 and 471 receive the already existing shafts 319 and 475. Hence it is comparatively easy to convert many of the existing photographic copying cameras into the improved form of the present invention, without requiring extensive alterations or rebuilding.

*Control means for feeding and severing mechanism*

In the casing 127 (Figs. 2, 4, and 6) which contains the push button 125 for operating the camera shutter, there is also a second push button 481 for initiating operation of the feeding and severing mechanism. Current is supplied to one side of this button 481 from the same main lead 121 previously mentioned. From the other side of this push button, a wire 483 leads, as best shown in Figs. 6 and 7, to one side of a solenoid 485, while a wire 487 leads from the other side of the solenoid to the other side 123 of the supply line, either directly or, in the preferred construction, through the previously mentioned switch points 249 of the switch operated by the arm 241. It will be remembered that it is advisable to initiate operation of the feeding and severing mechanism only while one of the pin bars 83 is traveling between the arms 195 and 215 (Figs. 10, 11, and 13) and that during this interval, the arm 241 is in the position shown in Figs. 13 and 16, with the switch plunger 245 depressed and with the switch contacts 249 connected to each other by the connecting member 255. This switch 249 is utilized in the preferred form of the invention for opening and closing the return wire 487 of the solenoid 485, as shown in the wiring diagram, Fig. 6, so that this solenoid cannot be operated at an improper time, even if the button 481 is pushed at such improper time, but can be operated only during the above mentioned interval when it is permissible to set the feeding and severing mechanism into operation.

Referring now to Fig. 7, it is seen that when the solenoid 485 is operated or energized, the attraction of the core or armature 491 raises one end 493 of a lever pivoted at 495 to the casing 497 which contains the solenoid. The other end 499 of this lever, which projects out through a slot in the casing, carries an adjusting screw which overlies the end 377 of the previously mentioned bell crank which carries the roller 383. Thus energization of the solenoid by pressing the button 481 during one of the permissible time intervals, causes downward depression of the outer end of the bell crank arm 377, which withdraws the roller 383 from its notch in the disk 363 and initiates one cycle of operation of the feeding and severing mechanism, provided, of course, that the motor 279 is running.

So far as the other features of this invention are concerned, the motor 279 may be allowed to run continuously. One feature of the present invention, however, is the provision of means for starting this motor at the beginning of a cycle of operation of the feeding and severing mechanism, and allowing it to stop at the conclusion of such cycle, which arrangement is of substantial advantage in that the motor will not be running during the time that an exposure is being made, and consequently the camera will not be vibrated by the running of this motor during the making of an exposure, in case the motor should happen to be somewhat out of balance, and better photographic results are secured when vibration is eliminated or reduced to a minimum.

Accordingly, in the preferred construction of the present invention, the motor 279 is supplied with current through a branch conductor 501 (Fig. 6) leading from the main supply conductor 121, and a branch conductor 503 leading from the main supply conductor 123. These wires 501 and 503 lead, as shown in the wiring diagram, to the junction box 177, from which the wire 503 leads on to the motor 279, while the wire 501 is connected to one of a pair of contacts 505 in the switch shown in greater detail in Fig. 19. From the other one of these contacts 505, the wire 507 leads to the other side of the motor 279.

These contacts 505 may be connected to each other by means of a connecting member 509 (Fig. 19) on the plunger 511 of the switch therein shown. The previously mentioned contact piece 173 for closing the contacts 171 is mounted on this same plunger 511, and the switch parts in general are similar to those shown in Figs. 15 and 16, with the exception that in the switch of Figs. 15 and 16, both pairs of contacts are closed together and both are opened together, whereas with this other switch of Fig. 19, the connecting members 173 and 509 are differently arranged on the switch plunger, so that the contacts 171 are connected to each other only when the contacts 505 are open or unconnected, and when the contacts 505 are connected to each other, the other contacts 171 are then open or disconnected. A spring 513 (Fig. 19) constantly tends to push the switch plunger 511 in a rightward direction to open the contacts 171 and close the contacts 509.

The right end of the switch plunger 511 is in line with an adjusting screw 515 (Figs. 7, 17, 18, and 19) carried by the upper end of the bell crank arm 379. The spring 381 of this bell crank is stronger than the switch spring 513 so that when the notch 371 is opposite the roller 383 on the bell crank, the spring 381 will pull this arm 379 leftwardly to the position shown in Fig. 17, where the adjusting screw 515 has pushed the switch plunger 511 leftwardly against the action of the weaker spring 513, opening the contacts 505 and closing the contacts 171. This is the normal rest position of the parts. It will be remembered from the previous description that the contacts 171 form part of the circuit of the yellow light 181, 183, which indicates that the shutter may be operated. Since the contacts 171 are closed only when the contacts 505 which control the motor 279 are open, it is seen that the yellow light to indicate that operation of the shutter is permissible, is lit only when the motor 279 is stopped, or at least when current thereto is cut off. Whenever current is being supplied to the motor 279, the contacts 171 are open and the yellow light is off, thus indicating to the operator that he should not operate the shutter at that time.

From the arrangement described, it will be seen that depression of the button 481 (at a time when the switch contacts 249 are closed by the arm 241) will operate the solenoid 485 to depress the arm 377 of the bell crank lever, which will withdraw the roller 383 from the notch in the disk 363 and at the same time will withdraw the arm 379 of the bell crank from the switch plunger 511 so that the spring 513 will move this switch plunger rightwardly, opening the contacts 171 and closing the contacts 505. The closing of the latter contacts will complete the circuit to the motor 279, immediately starting the motor. Since at this time the roller 383 will be withdrawn from the notch 371, the pawl nose 357 will be in engagement with the ratchet 355, so that as soon as the motor starts to turn the ratchet 355, the disk 363 will likewise begin to turn and the notch 371 will pass out from under the roller 383. The pressure on the button 481 can then be released almost instantly, but the feeding and severing mechanism will continue through its full cycle of operation because the periphery of the disk 363, acting on the roller 383, will hold the bell crank 377, 379 in the position shown in Fig. 18, until the end of the complete cycle of operation, when the notch 371 once more comes around to the roller 383. At the end of the cycle, when the roller drops into the notch, the spring 381 forces the bell crank arm 379 leftwardly from the position shown in Fig. 18 back to the initial position shown in Fig. 17, which pushes the switch plunger 511 leftwardly, opens the contacts 505 which control the motor 279, so that this motor rapidly slows down and stops, and at the same time closes the contacts 171 to light the yellow light 181, 183, and signal to the operator that it is safe for him to make the next exposure.

Sometimes, when many copies of the same document are to be made so that no rearrangement of the document on the copyholder 57 is necessary between exposures, or when different documents have been previously sorted and arranged in such manner that they can very quickly be placed in proper position on the copyholder, it is possible to make exposures with sufficient rapidity so that a freshly exposed film area can be fed down in time to catch each successive pin bar 83. When this is the case, the button 481 for initiating action of the feeding and severing mechanism can be short circuited by means of a switch 521 (Fig. 6) so that the operation of the feeding and severing mechanism will be controlled automatically by the closing of the contacts 249 as each succeeding pin bar reaches the arm 195. Then all that the operator needs to do is to arrange the fresh document to be copied in proper position on the copyholder 57 (even this being unnecessary if several copies of the same document are being made) and press the shutter button 125 as soon as the yellow light comes on, holding it depressed for the proper number of seconds to give the proper exposure. Then in a moment, the green light will come on, due to the closing of the switch contacts 247 by the arrival of the next pin bar 83 at the arm 195, and at this same instant the simultaneous closing of the contacts 249 will operate the solenoid 485 (because the button 481 is short circuited by the switch 521) which will extinguish the yellow light and start the motor 279 so that the feeding and severing operation will take place. During this time the operator can be arranging his next piece of material to be copied, and then as soon as the yellow light comes on again at the completion of the feeding and severing operation, he can again press the shutter button 125 to make the next exposure, and so on.

*Auxiliary remote control means*

The control box or casing 127 mounted on the copyholder supporting bracket is at some distance from the camera shutter and from the feeding and severing mechanism, so it constitutes what may be called remote control means for operating the shutter and the feeding and severing mechanism. But it is desirable also to provide means for operating the shutter and the feeding and severing mechanism from a still more remote point, when the copy to be photographed is not placed on the copyholder 57 but is placed at a more remote point, as, for example, when a very large map or chart is to be photographed on a reduced scale. In such instances, the map, chart, or similar article to be photographed may be arranged approximately vertically at 531 (Fig. 4) on a board 533 held by an easel or secured to a wall 535 of the room containing the photographic copying machine. The lens and prism assembly 55 is, in this case, turned 90° so that it will receive light rays coming approximately horizontally from the vertical copy, as indicated in the plan view, Fig. 4, rather than light rays coming upwardly from the horizontal copyholder 57.

Figure 5:
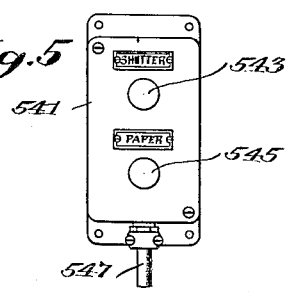
Fig. 5 is a view on a larger scale of the auxiliary remote control box shown in Fig. 4.

In order that the operator may operate the shutter and the feeding and severing mechanism from any desired point within reason, such as from a point adjacent the large copyholder 533, there is provided an auxiliary remote control box or casing 541 (Figs. 4 and 5) which contains a shutter push button 543 and a feeding and severing mechanism push button 545 similar to the buttons 125 and 481, respectively, of the box 127. The auxiliary control box 541 is connected to the box 127 by a three wire flexible cable 547 of any desired length. One wire is connected in common to one side of each of the buttons 543 and 545, a second wire is connected to the opposite side of the button 543, and a third wire is connected to the opposite side of the button 545. This three wire cable 547 terminates in a three prong plug 549 (Fig. 4) which may be plugged into a three prong socket 551 (Fig. 6) so that one prong makes connection, as shown in the wiring diagram, with the supply wire 121 leading to one side of both of the buttons 125 and 481. Another prong, when inserted in the socket 551, makes connection, as shown, with the return wire 129 leading from the opposite side of the button 125, while the third prong makes connection with the return wire 483 leading from the opposite side of the button 481.

With this arrangement, pressure on the button 543 to close the circuit at this point will (when the plug 549 is properly inserted in the socket 551) have exactly the same effect as depression of the button 125 in the main control box 127, while depression of the button 545 in the auxiliary control box will have the same effect as pressing the button 481 of the main control box 127. The auxiliary box 541, because of the flexible cord 547, can be carried around from place to place and located in any position most convenient to the operator of the photo copying machine, so that he can perform the necessary and usual operations of the machine from this auxiliary box 541, without the necessity of leaving his station adjacent this box.

*Summary of operation*

The operation of the various parts has been fully described in connection with the individual description of these parts, but a brief general summary of the operation, as a whole, of this preferred illustrative embodiment of the machine, may be helpful. It is to be understood that the machine may be operated in various ways according to different photographic requirements, and some of the features of the invention may be used advantageously even when other features are not used, but the operations as outlined below constitute the usual preferred sequence of operations when the photo copying machine is equipped with all of the different features of the invention above described.

The magazine section 39 of the camera is loaded with a sufficient supply of fresh unexposed film on the roll 45 (Fig. 7) and the film is properly threaded through the machine so as to extend downwardly along the front of the focal plane support sections 51 and 53 and through the feed rollers 71 and 73.

The motor 99 (Fig. 1) is set into continuous operation so that it continuously drives the conveyor chains 85 and thus carries the series of pin bars 83 continuously through the machine in the manner already familiar in this art. It is noted that this motor 99 is not mounted directly on the camera body but rather on the casing 95 which contains the developing and fixing mechanism, at some distance from the camera body, where it is very unlikely that any vibration caused by operation of this motor will adversely affect the camera.

The tank 91 (Figs. 1, 2, and 10) of the developing and fixing mechanism contains the developing solution, while the tank 93 contains the various washing and fixing baths.

Assuming that the document or other article to be photographed is of a size which can go on the copyholder 57, it is arranged on this copyholder by the operator, and if the camera is not already in focus, it is properly focused, for the required size of reproduction (same size, reduction, or enlargement, as desired), by moving the copyholder bracket 59 upwardly or downwardly on its rails on the frame 31, and by moving the back section 35 and magazine section 39 of the camera body forwardly or rearwardly along its rails on the frame 31, the entire developing and fixing mechanism moving along the rails concurrently with the camera body. Suitable focusing scales of known form are preferably associated with the copyholder and with the camera body so that both of these can be brought quickly to the proper focused position for any desired ratio of reduction or enlargement.

The copy on the board 57 is illuminated by the lamps 61. At any time while the yellow light 181, 183 is lit (so long as the red light 153, 159 is not lit), the operator knows it is permissible to make an exposure, and when he is ready to make it, he depresses the button 125 of the control box 127, conveniently located beside the copyholder 57, so that the operator need not leave the station which he occupies when arranging copy on the copyholder.

Depression of this button 125 energizes the solenoid 111 (Fig. 12) to open the shutter 65, which remains open so long as the button 125 keeps the circuit closed and which closes as soon as the pressure on the button is released. The operator times the exposure by keeping the button depressed for the required length of time.

Now he is ready to operate the feeding and severing mechanism by depressing the button 481, but he does this only when the green light 265, 267 is showing, and this light shows only during the time interval when one of the series of pin bars 83 is moving between the trip arms 195 and 215 (Figs. 10, 11, and 13), that is, in the interval beginning when one of the pin bars has tripped the arm 195 and ending when it contacts with and trips the arm 215. In this time interval of a few seconds, during which the green light is on, the operator depresses the button 481, which energizes the solenoid 485, causing downward pressure on the forwardly extending bell crank arm 377 (Figs. 8 and 17) which withdraws the roller 383 from the notch 371 in the disk 363, and at the same time withdraws the upper arm 379 of the bell crank from the switch plunger 511 (Fig. 19) so that this switch plunger moves forwardly under the influence of the spring 513, opening the switch contacts 171 and closing the switch contacts 505. The opening of the contacts 171 causes the yellow light 181, 183 to go out, while the closing of the contacts 505 starts the motor 279, which immediately begins, through the gearing 283, 285, 331, 333, 343, and 345, to turn the ratchet 355. The disk 363 immediately begins to turn with the ratchet 355, because the withdrawal of the roller 383 from the notch in the periphery of this disk has at the same time released the tail 367 of the pawl 359 which is mounted on the disk 363, so that the spring 365 has thrown the nose 357 of this pawl into engagement with the ratchet 355.

The button 481 may be released after a moment, and it is not necessary to keep it depressed during the entire cycle of operation of the feeding and severing mechanism, for the roller 383 will ride on the smooth circular part of the periphery of the disk 363, holding the arm 379 away from the switch plunger 511 and keeping the switch contacts 505 closed, thus keeping the motor 279 running until the end of one complete cycle, which cycle ends when the notch 371 once more comes around to the roller 383 and allows the roller to drop into this notch, simultaneously stopping the disk at the right point, pressing against the tail 367 of the pawl 359 to remove the nose 357 from the ratchet 355 so that the ratchet may run on a short distance due to momentum and need not be brought to a sudden stop, and also pressing the arm 379 leftwardly against the switch plunger 511 to open the switch contacts 505 to stop the motor 279, and likewise closing the contacts 171 to cause the yellow light 181, 183 once more to light, and to remain lit until the feeding and severing mechanism is again operated.

During this cycle of one complete revolution of the disk 363, the following actions have occurred: Almost immediately at the beginning of the cycle, the advance edge of the cam element 391 has displaced the roller 411 in an outward direction away from the shaft 349, and this has swung the lever 413, 417 to swing in turn the bell crank 419, 423 in a manner to press the outer end of the shaft 307 inwardly from the position shown in Fig. 23 to the position shown in Fig. 21, engaging the driving clutch element 305 with the driven clutch element 313. The clutch element 305 at this time is being constantly rotated from the motor 279 through the gearing 301, 303, and as soon as the two clutch elements engage with each other, the clutch element 313 begins to rotate likewise, which turns the feeding roller 71 and starts to feed the exposed portion of film 43 downwardly over the focal plane support.

The extent of such feeding depends upon the effective length to which the composite cam elements 391, 393, and 395 have been adjusted by previous setting of the adjusting knob 399. The feeding motion of the roller 71 continues until the rear or trailing edge of the composite cam passes the roller 411, at which time the roller is free to move once more to its initial position somewhat closer to the shaft 349, and the spring 325 moves the driving clutch element 305 outwardly from the engaged position shown in Fig. 21 to the disengaged position shown in Fig. 23, stopping the rotation of the feeding roller 71.

Near the latter part of the cycle of rotation and at a time after the clutch element 305 has been disengaged even when the composite cam is adjusted to its maximum length, the roller 437 on the disk 363 comes into contact with the forward or right hand one of the two branches at the upper end of the forked arm 441, and moves this arm in a clockwise or forward position from its normal rest position shown in Figs. 18 and 20; then the second roller 439 comes in contact with the left hand fork of the arm and moves it still further forwardly or clockwise, to the maximum or utmost position illustrated in dotted lines in Fig. 18. This clockwise movement of the arm 441, through the connected segment 451, causes corresponding counterclockwise rotation of the gear 453 and its sleeve 455, and in the absence of any unusual impediment to operation of the severing knife, the collar 467 and shaft 457 have correspondingly moved in a counterclockwise direction, to turn the knife operating shaft 475, causing the gear segments 477 to thrust the racks 479 forwardly to carry the movable knife 75 against the film and cut it off. If, however, the paper has become jammed between the knives or for any reason there is other unusual impediment to the knife operation, the parts will not be broken but the shafts 475 and 457 and the collar 467 will move as far as possible and then stop, while the sleeve 455 may continue through its full cycle of movement by displacing the spring 469.

After the second roller 439 passes beyond the end of the arm 441, the spring 449 returns this arm and all of the parts operated thereby to their initial rest positions, moving the knife back out of the way of the film. And so, at the end of one complete revolution of the shaft 349 and disk 363, the feeding roller 71 has been operated to feed the film downwardly to an extent or length dependent upon the setting of the composite cam elements 391, 393, and 395, and this section of film which has been fed downwardly has been cut off by operation of the knife 75, and all of the parts are once more in their initial or normal positions of rest.

Now the yellow light 181, 183 is once more lit, as above mentioned, and the operator is free once more to press the button 125 to make another exposure. If another print of the same document on the copy board 57 is required, no change in the copy is needed, of course, but if another document is now to be photographed, the operator has been removing the previously photographed document and has been placing the fresh document in position on the copy board, during the time that the feeding and severing mechanism has been operating, and he may start this arranging of the copy as soon as he has pressed and quickly released the button 481. If, however, many copies of the same document are to be made, or if the documents are so arranged that they can very quickly be placed on and removed from the copyholder 57, then the operator may close the switch 521 to short circuit the button 481 so that the feeding and severing mechanism will operate automatically each time that one of the pin bars trips the arm 195, requiring no manual actuation of the button 481.

During the course of the photographing operation, if a splice 137 (Figs. 8 and 9) in the film should happen to reach the upper edge of the focal plane support, the associated notches or openings 135 would cause the feeler 131 to close the electric circuit 149, 151, twice in rapid succession, thus twice lighting the red light 153, 159 and sounding the buzzer 155, warning the operator of the presence of the splice at or near the focal plane support. The operator would then give the feeding and severing mechanism one or two extra operations by pressing the button 481 to feed the spliced portion of the film away from the focal plane without making a print thereon, and would then resume making the exposures.

If the copy to be photographed is too large to go on the copy board 57, the prism unit may be turned to point toward the wall or easel, and the copy may be placed on a large board 533 (Fig. 4) and the shutter and the feeding and severing mechanism may be operated by the buttons 543 and 545, respectively, in the auxiliary remote control box 541, in exactly the same manner as by pressing the buttons 125 and 481 of the normal control box.

Certain subject matter disclosed but not claimed herein is claimed in or divisional applications, Serial No. 298,436, filed October 7, 1939, for Feeding and severing mechanism for photographic copying machines (now Patent 2,191,212, granted February 20, 1940), and Serial No. 298,437, filed October 7, 1939, for Severing mechanism for photographic copying machines (now Patent 2,191,213, granted February 20, 1940).

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. A photographic copying machine of the type including a camera having a focal plane, shutter means operable to admit light to said focal plane to make an exposure, mechanism for feeding an exposed section of photographic film out of said focal plane to draw a fresh unexposed section into said focal plane, a motor for driving said mechanism, and control means operable independently of said shutter means for conditioning said mechanism for a cycle of operation, characterized by the provision of means for starting said motor when said control means is operated to condition said mechanism for a cycle, and for stopping said motor substantially at the completion of such cycle, and means for operating said shutter means independently of said control means and of said motor, so that an exposure may be made while said motor is at rest, to avoid jarring the camera during exposure by the vibration of said motor.

2. A photographic copying machine of the type including a camera having a focal plane, mechanism for feeding an exposed section of photographic film out of said focal plane to draw a fresh unexposed section into said focal plane, a motor for driving said mechanism, and control means for conditioning said mechanism for a cycle of operation, characterized by the provision of a first electric circuit for supplying current to said motor, a second electric circuit, a signal lamp in said second circuit, and switch means controlled by said control means for closing said first circuit and opening said second circuit when said control means is operated to condition said mechanism for a cycle, and for opening said first circuit and closing said second circuit substantially at the completion of such cycle.

3. A photographic copying machine of the type including a camera having a focal plane, mechanism for feeding an exposed section of photographic film out of said focal plane to draw a fresh unexposed section into said focal plane, a motor for driving said mechanism, and control means for conditioning said mechanism for a cycle of operation, characterized by the provision of a first electric circuit for supplying current to said motor, a second electric circuit, a signal lamp in said second circuit, electromagnetic means for operating said control means, a third electric circuit for supplying current to said electromagnetic means, switch means in said third circuit to close the same to render said electromagnetic means effective to operate said control means, and switch means controlled by said control means for closing said first circuit and opening said second circuit when said control means is operated to condition said mechanism for a cycle, and for opening said first circuit and closing said second circuit substantially at the completion of such cycle.

4. A photographic copying machine of the type including a camera having a focal plane, mechanism for feeding an exposed section of photographic film out of said focal plane to draw a fresh unexposed section into said focal plane, a motor for driving said mechanism, and control means for conditioning said mechanism for a cycle of operation, characterized by the provision of a first electric circuit for supplying current to said motor, electromagnetic means for operating said control means, a second electric circuit for supplying current to said electromagnetic means, switch means in said second circuit to close the same to render said electromagnetic means effective to operate said control means, and switch means controlled by said control means for closing said first circuit to start said motor when said control means is operated to condition said mechanism for a cycle, and for opening said first circuit substantially at the completion of such cycle.

5. A photographic copying machine of the type including a camera having a focal plane, mechanism for feeding an exposed section of photographic film out of said focal plane to draw a fresh unexposed section into said focal plane and for severing said exposed section from said unexposed section, and movable conveying means for conveying the severed exposed section of film, characterized by the provision of means operated by movement of said conveying means for controlling said feeding and severing mechanism.

6. A photographic copying machine of the type including a camera having a focal plane, mechanism for feeding an exposed section of photographic film out of said focal plane to draw a fresh unexposed section into said focal plane and for severing said exposed section from said unexposed section, a motor for driving said mechanism, and movable conveying means for conveying the severed exposed section of film, characterized by the provision of switch means for starting and stopping said motor, a movable control member for operating said switch means, means including an electric circuit for operating said control member to operate said switch means to start said motor, and a switch operated by movement of said conveying means and connected in said electric circuit to control said circuit from movement of said conveying means.

7. A photographic copying machine of the type including a camera having a focal plane, mechanism for feeding an exposed section of photographic film out of said focal plane to draw a fresh unexposed section into said focal plane and for severing said exposed section from said unexposed section, a holder for receiving and holding a section of film severed by said severing mechanism, and a conveyor including a pick-up member movable through a path of travel passing adjacent said holder to pick up a severed section held thereby and carry it along from said holder, characterized by the provision of means including an electric circuit for initiating operation of said feeding and severing mechanism, said circuit having a switch therein, and means operated by said conveyor for closing said switch when said pick-up member reaches a predetermined point in its travel approaching said holder.

8. A photographic copying machine of the type including a camera having a focal plane, mechanism for feeding an exposed section of photographic film out of said focal plane to draw a fresh unexposed section into said focal plane and for severing said exposed section from said unexposed section, a holder for receiving and holding a section of film severed by said severing mechanism, and a conveyor including a pick-up member movable through a path of travel passing adjacent said holder to pick up a severed section held thereby and carry it along from said holder, characterized by the provision of means including an electric circuit for initiating operation of said feeding and severing mechanism, said circuit having a switch therein, and means operated by said conveyor for closing said switch when said pick-up member reaches a predetermined point in its travel approaching said holder and for opening said switch when said pick-up member reaches a subsequent predetermined point in its said travel.

9. A photographic copying machine of the type including a camera having a focal plane, mechanism for feeding an exposed section of photographic film out of said focal plane to draw a fresh unexposed section into said focal plane and for severing said exposed section from said unexposed section, a holder for receiving and holding a section of film severed by said severing mechanism, and a conveyor including a pick-up member movable through a path of travel passing adjacent said holder to pick up a severed section held thereby and carry it along from said holder, characterized by the provision of means including an electric circuit for initiating operation of said feeding and severing mechanism, said circuit having a switch therein, spring means tending to open said switch, and means operated by said conveyor for closing said switch and holding it closed during the time that said pick-up member is passing through a predetermined portion of its path of travel approaching said holder.

10. A photographic copying machine of the type including a camera having a focal plane, mechanism for feeding an exposed section of photographic film out of said focal plane to draw a fresh unexposed section into said focal plane and for severing said exposed section from said unexposed section, a holder for receiving and holding a section of film severed by said severing mechanism, and a conveyor including a pick-up member movable through a path of travel passing adjacent said holder to pick up a severed section held thereby and carry it along from said holder, characterized by the provision of means including an electric circuit for initiating operation of said feeding and severing mechanism, said circuit having two switches in series therein, one of said switches being manually controlled, and means operated by said conveyor for closing the other of said switches when said pick-up member reaches a predetermined point in its travel approaching said holder and for opening said other of said switches when said pick-up member reaches a subsequent predetermined point in its said travel.

11. A photographic copying machine of the type including mechanism for feeding film and severing exposed sections of film, a holder for receiving and holding a severed section of film, and film conveying mechanism including a pick-up device movable through a path of travel passing adjacent said holder to pick up a severed film section from said holder and carry it away from said holder, characterized by the provision of visual signal means, and means operated by said conveying mechanism for rendering said signal means operative during a substantial time interval while said pick-up device is travelling within a predetermined zone as it approaches said holder.

12. A photographic copying machine of the type including mechanism for feeding film and severing exposed sections of film, a holder for receiving and holding a severed section of film, and film conveying mechanism including a pick-up device movable through a path of travel passing adjacent said holder to pick up a severed film section from said holder and carry it away from said holder, characterized by the provision of electric signalling means including a circuit, a switch for controlling said circuit, and means including parts operable by movement of said conveying mechanism for closing said switch when said pick-up device reaches a predetermined point in its travel toward said holder and for opening said switch again when said pick-up device reaches a second predetermined point at a later stage of its travel toward said holder.

13. A photographic copying machine of the type including mechanism for feeding film and severing exposed sections of film, a holder for receiving and holding a severed section of film, and film conveying mechanism including a pick-up device movable through a path of travel passing adjacent said holder to pick up a severed film section from said holder and carry it away from said holder, characterized by the provision of a switch member movable from an open position to a closed position and vice versa, a spring constantly tending to hold said member in one of said positions, an arm normally lying in the path of travel of a part of said conveying mechanism to be engaged and moved thereby when said pick-up device reaches a predetermined point in its travel, means operatively connecting said arm to said switch member in such manner that movement of said arm by said conveying mechanism serves to move said switch member against the force of said spring to the other of its said positions, a latch for holding said arm in its operated position to maintain said switch member in said other position against the force of said spring, and a latch tripping member lying in the path of travel of a part of said conveying mechanism to be engaged and moved thereby when said pick-up device reaches a second predetermined point in its travel, movement of said latch tripping member by said conveying mechanism being effective to release said latch so that said arm may return to its initial position and said switch member may be moved to its initial position under the influence by said spring.

14. A construction as described in claim 13, further characterized by the provision of an electric circuit controlled by said switch member, and indicating means operated by said electric circuit for indicating the time intervals within which said pick-up device is travelling between said first mentioned predetermined point and said second predetermined point.

15. A construction as described in claim 13, further characterized by the provision of an electric circuit controlled at least in part by said switch member, for controlling operation of said feeding and severing mechanism.

16. A construction as described in claim 13, further characterized by the provision of an electric circuit controlled at least in part by said switch member, for controlling operation of said feeding and severing mechanism, and a manually controlled switch in said electric circuit.

17. A photographic copying machine of the type including mechanism for feeding film and severing exposed sections of film, a holder for receiving and holding a severed section of film, and film conveying mechanism including a pick-up device movable through a path of travel passing adjacent said holder to pick up a severed film section from said holder and carry it away from said holder, characterized by the provision of a manually operable switch, and electric circuit means controlled jointly by said switch and by the position of said pick-up device with respect to said holder, for controlling said feeding and severing mechanism.

18. A photographic copying machine of the type including mechanism for feeding film and severing exposed sections of film, a holder for receiving and holding a severed section of film, and film conveying mechanism including a pick-up device movable through a path of travel passing adjacent said holder to pick up a severed film section from said holder and carry it away from said holder, characterized by the provision of a manually operable switch, and electric circuit means controlled jointly by said switch and by the position of said pick-up device with respect to said holder for initiating a cycle of operation of said feeding and severing mechanism.

19. A photographic copying machine of the type including a camera having a supply of photographic film and a shutter operable to admit light to expose said film, and mechanism for feeding exposed portions of film, characterized by the provision of a control panel mounted in a position readily accessible to an operator, electromagnetic means for operating said shutter, a manually operable switch mounted on said control panel for controlling said electromagnetic means, means including an electric circuit for initiating operation of said film feeding mechanism, and a second manually operable switch also mounted on said control panel and operatively interposed in said electric circuit to control said circuit.

20. A photographic copying machine of the type including a camera having a supply of photographic film and a shutter operable to admit light to expose said film, and mechanism for feeding exposed portions of film, characterized by the provision of a control panel mounted in a position readily accessible to an operator, electromagnetic means for operating said shutter, a switch mounted on said control panel for controlling said electromagnetic means, means including an electric circuit for initiating operation of said film feeding mechanism, a second switch also mounted on said control panel and operatively interposed in said electric circuit to control said circuit, an electric socket also mounted on said control panel and electrically connected to both of said switches, a second control panel of portable character, two electric switches mounted on said second panel, and a flexible electric cord operatively connected to said switches on said second panel and having a plug which may be inserted in said socket on said first panel to connect said switches on said second panel operatively to the switch circuits of said first panel, so that said shutter and said feeding mechanism may be operated by actuating said switches on said second panel.

21. A photographic copying machine of the type including a camera having a supply of photographic film and a shutter operable to admit light to expose said film, mechanism for feeding exposed portions of film and for severing such portions, and a conveyor for moving the severed exposed portions of film after severance thereof, characterized by the provision of visual signal means of one color controlled by movement of said conveyor for indicating the time intervals during which said conveyor is in proper position for operation of said feeding and severing mechanism, and visual signal means of another color controlled by said feeding and severing mechanism to indicate those time intervals in which said feeding and severing mechanism is in a condition permitting safe operaton of said shutter.

22. A photographic copying machine of the type including a camera having a supply of photographic film and a shutter operable to admit light to expose said film, mechanism for feeding exposed portions of film and for severing such portions, and a conveyor for moving the severed exposed portions of film after severance thereof, characterized by the provision of visual signal means of one color controlled by movement of said conveyor for indicating the time interval during which said conveyor is in proper position for operation of said feeding and severing mechanism, and visual signal means of another color controlled by said feeding and severing mechanism to indicate those time intervals in which said feeding and severing mechanism is in a condition of rest, so that said shutter may be safely operated.

23. A photographic copying machine of the type including a camera having a supply of photographic film with one or more splices therein and a film variation associated with each splice, a shutter operable to admit light to expose said film, mechanism for feeding exposed portions of film and for severing such portions, and a conveyor for moving the severed exposed portions of film after severance thereof, characterized by the provision of visual signal means of one color controlled by said film variation for indicating the proximity to the exposure area of one of said splices, visual indicating means of a second color controlled by said conveyor for indicating when said conveyor is in a position in which operaton of said feeding and severing mechanism may be safely initiated, and visual signal means of a third color controlled by said feeding and severing mechanism for indicating when said feeding and severing mechanism is in a condition enabling satisfactory operation of said shutter.

PAUL LANDROCK.
ARTHUR W. CAPS.